United States Patent [19]

Yahav et al.

[11] Patent Number: 5,050,490
[45] Date of Patent: Sep. 24, 1991

[54] DOMESTIC FOOD COOKING APPARATUS

[75] Inventors: Shimon Yahav, Rehovot; Yair Daar, Moshav Galia, both of Israel

[73] Assignee: Lancet S.A., Panama

[21] Appl. No.: 332,327

[22] Filed: Apr. 3, 1989

[30] Foreign Application Priority Data

Apr. 29, 1988 [IL] Israel ......................................... 86234
Feb. 10, 1989 [IL] Israel ......................................... 89260

[51] Int. Cl.⁵ ........................... A47J 27/00; B01F 7/14
[52] U.S. Cl. ...................................... 99/348; 219/432;
                                              219/433; 366/146; 366/255
[58] Field of Search .................. 99/348, 483; 219/432,
        219/433, 436, 438; 366/144, 146, 255, 256, 243

[56] References Cited

U.S. PATENT DOCUMENTS

| | | |
|---|---|---|
| 792,721 | 6/1905 | McCarty . |
| 1,109,210 | 9/1914 | Dorr . |
| 1,491,991 | 4/1924 | Lacy et al. . |
| 1,711,955 | 5/1929 | Larson . |
| 1,790,115 | 1/1931 | Sells . |
| 2,600,486 | 7/1952 | Cox . |
| 3,232,210 | 2/1966 | Ogle . |
| 3,237,924 | 3/1966 | Soper . |
| 3,407,872 | 10/1968 | Crane . |
| 3,635,147 | 1/1972 | Lee . |
| 3,722,399 | 3/1973 | Cole . |
| 3,761,668 | 9/1973 | Harden, Jr. et al. . |
| 3,786,740 | 1/1974 | Martin . |
| 3,919,763 | 11/1975 | Ulam . |
| 4,063,068 | 12/1977 | Johnson et al. . |
| 4,073,225 | 4/1978 | Lang-Ree . |
| 4,149,455 | 4/1979 | Ross . |
| 4,217,481 | 8/1980 | Fischer . |
| 4,397,874 | 8/1983 | Piotrowski . |
| 4,417,506 | 11/1983 | Herbst et al. . |
| 4,458,139 | 7/1984 | McClean . |
| 4,467,162 | 8/1984 | Kondo et al. . |
| 4,576,089 | 3/1986 | Chauvin . |
| 4,629,843 | 12/1986 | Kato et al. . |
| 4,649,810 | 3/1987 | Wong . |
| 4,693,610 | 9/1987 | Weiss . |
| 4,717,812 | 1/1988 | Makita . |
| 4,763,567 | 8/1988 | Dalquist, III et al. . |
| 4,763,570 | 8/1988 | Bellanca . |
| 4,816,647 | 3/1989 | Payne . |
| 4,817,510 | 4/1989 | Kowalics et al. . |
| 4,820,054 | 4/1989 | Wong . |

FOREIGN PATENT DOCUMENTS

| | | |
|---|---|---|
| 314030 | 6/1929 | United Kingdom . |
| 354869 | 7/1930 | United Kingdom . |
| 421697 | 1/1934 | United Kingdom . |
| 482544 | 3/1938 | United Kingdom . |
| 743322 | 9/1950 | United Kingdom . |
| 846310 | 8/1957 | United Kingdom . |
| 1154821 | 5/1967 | United Kingdom . |
| 1436207 | 8/1973 | United Kingdom . |
| 1473131 | 6/1974 | United Kingdom . |
| 2196238 | 4/1986 | United Kingdom . |
| 2186184 | 8/1987 | United Kingdom . |

Primary Examiner—Robert W. Jenkins
Attorney, Agent, or Firm—Finnegan, Henderson, Farabow, Garrett & Dunner

[57] ABSTRACT

Domestic food cooking apparatus including a container for holding a food product to be prepared and defining a heating surface and electrical resistance heating apparatus fixedly associated with the container in electrically insulated touching relationship with the heating surface.

21 Claims, 26 Drawing Sheets

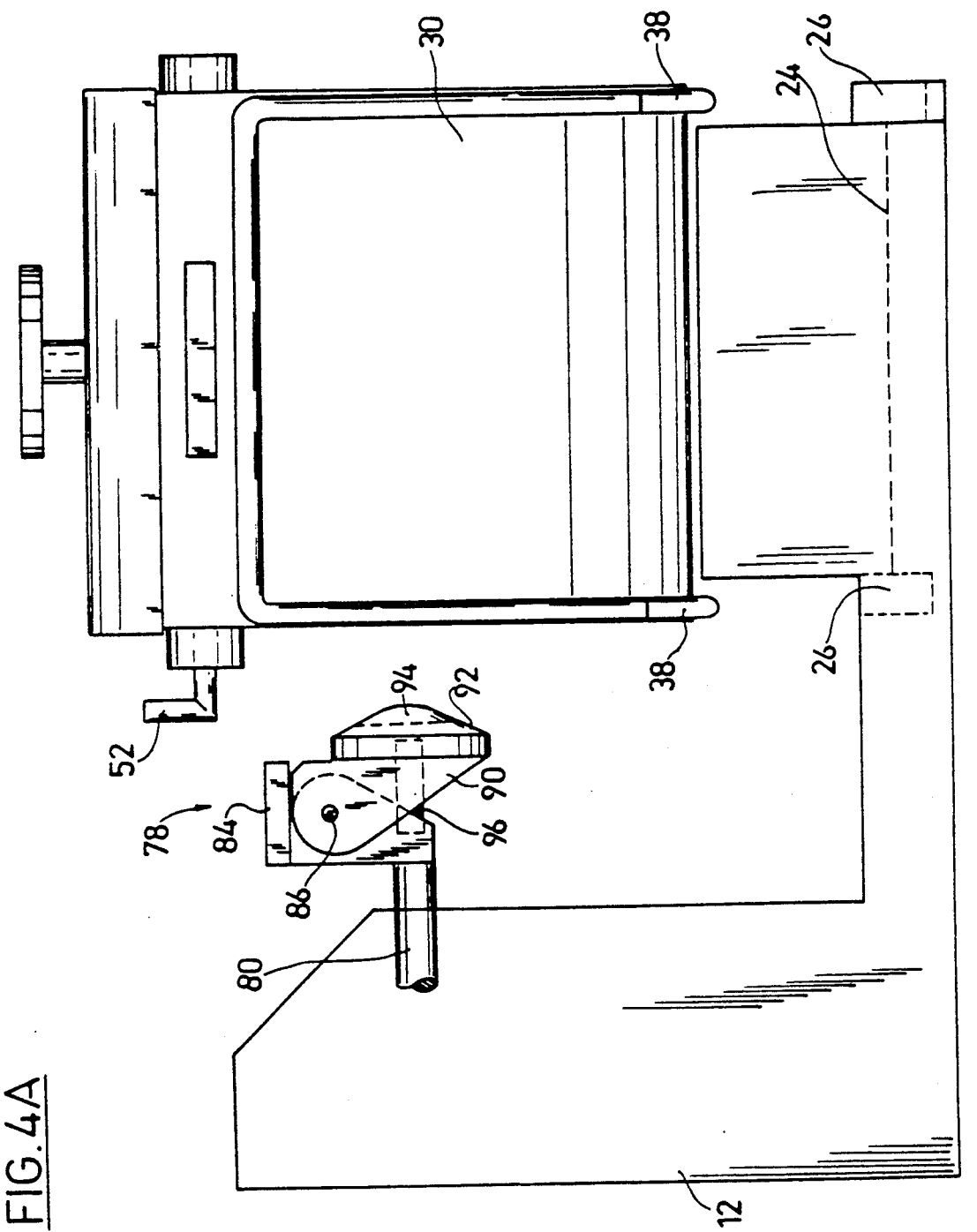

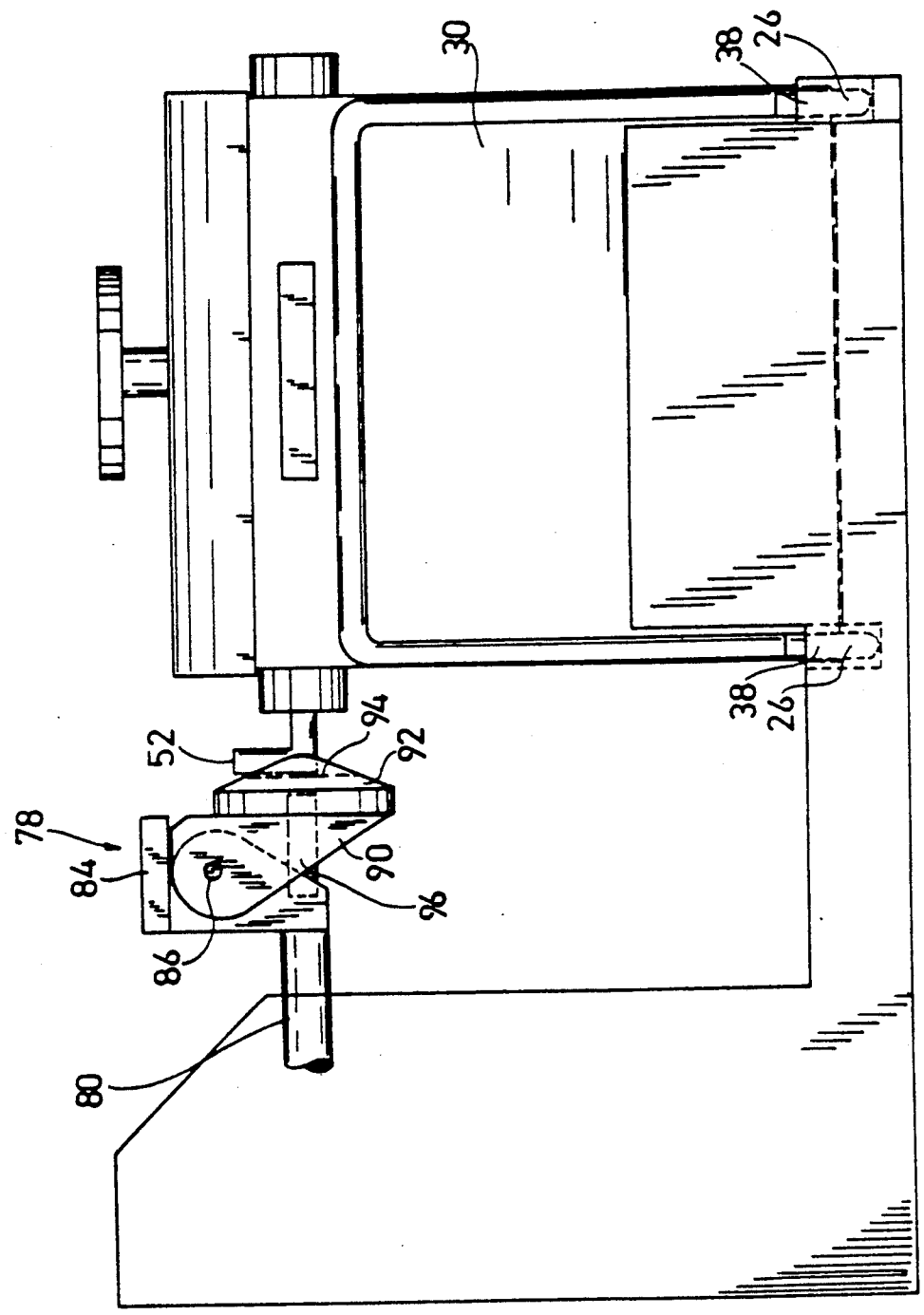

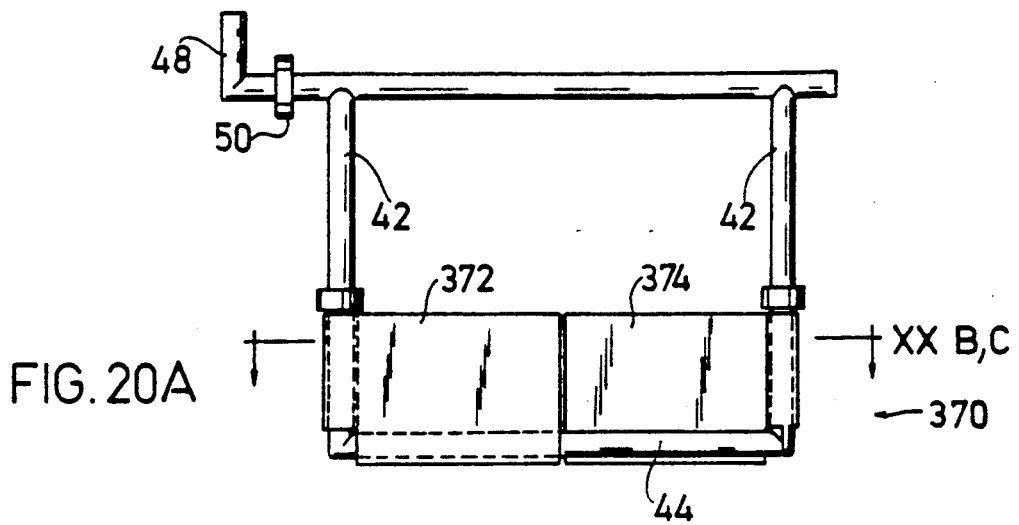
FIG. 20A
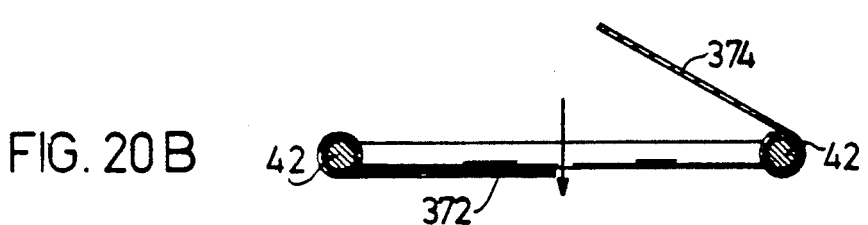
FIG. 20B
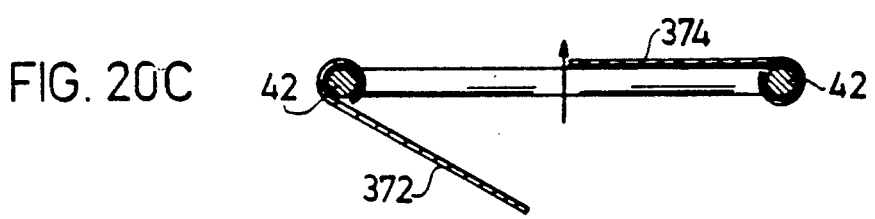
FIG. 20C
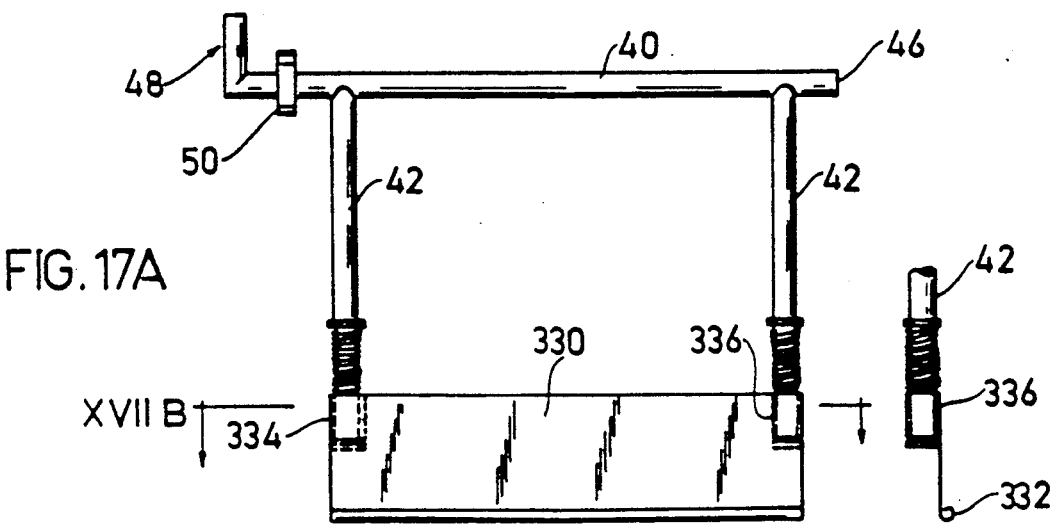
FIG. 17A
FIG. 17B
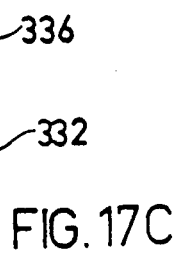
FIG. 17C

DOMESTIC FOOD COOKING APPARATUS

FIELD OF THE INVENTION

The present invention relates to domestic food cooking apparatus generally.

BACKGROUND OF THE INVENTION

Various types of domestic food cooking apparatus are known in the art. In the domestic cooking art, there are known various automated cooking devices including mechanical mixing apparatus.

The following patents are considered to be representative of the prior art:

U.S. Pat. No. 3,635,147 describes a combination cooking-stirring vessel in which two sets of blades are rotated continuously by means of a motor drive applied to the rim of a generally round bowl, as food is heated. One set of blades rotates along the bottom of the bowl except at the center bottom region.

U.S. Pat. No. 1,790,115 describes apparatus for treating food products comprising a plurality of rotating blades and a curved bottom surface.

U.S. Pat. No. 4,693,610 describes an electrical household appliance for culinary purposes including apparatus for stirring and heating the contents of a bowl. This apparatus provides continuous rotation of a stirrer adjacent the bottom of a flat bottomed bowl.

U.S. Pat. No. 4,649,810 describes a microcomputer-controlled, integrated cooking apparatus for automatically preparing culinary dishes. The apparatus includes a memory for storing one or more recipe programs. The recipe program specifies schedules for dispensing the ingredients from a compartmentalized carousel into a flat bottom cooking vessel, for heating the vessel and for continuously stirring the contents of the vessel.

U.S. Pat. No. 1,491,991 describes a beverage mixer and heater which provides stirring of the contents of a container having an electric heating element incorporated in its construction.

In an industrial environment, which is distinct from the domestic food cooking field discussed above, there have been proposed various devices which provide heating or cooling of food products. For example, U.S. Pat. No. 4,073,225 describes an industrial scale, continuously operable meatball cooker employing a trough which is engaged by helical vanes. U.S. Pat. No. 3,407,872 employs a trough-like tank having a reciprocating paddle for circulating a heating or cooling fluid.

SUMMARY OF THE INVENTION

The present invention seeks to provide domestic food cooking apparatus suitable for use with a wide range of foods. The present invention provides a convenient-to-use domestic cooking device which is suitable for cooking foods, such as soups, cereals, jellies and jams; deep frying of foods such as french fries and roasting of bulk foods, such as nuts, popcorn, coffee beans and sunflower seeds while applying reciprocal stirring to the food, thereby preventing inadvertent burning of the food. The term "cooking" will be used throughout to refer generally to the application of heat to foodstuffs in a domestic context and includes, inter alia, heating liquids of various viscosities, dry roasting of bulk foodstuffs, such as nuts, beans and seeds. The term "cooking" will be used hereinbelow interchangeably with "heating".

There is thus provided in accordance with a preferred embodiment of the present invention domestic food cooking apparatus including a container for holding a food product to be prepared and defining a heating surface and electrical resistance heating apparatus fixedly associated with the container in electrically insulated touching relationship with the heating surface.

Additionally in accordance with a preferred embodiment of the present invention there is thus provided domestic food cooking apparatus including a container for holding a food product to be prepared, heating apparatus operatively associated with the container, and reciprocating stirring apparatus operatively associated with the container for providing reciprocal stirring of the food product therein.

Further in accordance with an embodiment of the present invention there is provided domestic food cooking apparatus including a container for holding a food product to be prepared and heating apparatus operatively associated with the container and comprising a foil whose surface configuration generally conforms to the surface configuration of a surface of the container and through which an electrical current is passed for resistance heating thereof.

Still further in accordance with an embodiment of the invention there is provided domestic food cooking apparatus including a base, a container for holding a food product to be prepared, heating apparatus operatively associated with the container, and stirring apparatus including a stirring driver mounted on the base, a stirring element operatively associated with the container and quick coupling apparatus providing automatic engagement of the stirring driver with the stirring element when the container is located on the base.

Yet further in accordance with an embodiment of the present invention there is provided domestic food cooking apparatus including a container for holding a food product to be prepared, heating apparatus operatively associated with the container and stirring apparatus operatively associated with the container for providing stirring of the food product therein, the stirring apparatus being operative to intermittently move from a relatively lowered location inside the container to a relatively raised location inside the container.

Additionally in accordance with an embodiment of the invention there is provided domestic food cooking apparatus including a container for holding a food product to be prepared and defining a heating surface, heating apparatus operatively associated with the container at the heating surface and stirring apparatus operatively associated with the container for providing stirring of the food product therein, said stirring apparatus being operative to intermittently cause a substantial portion of the food product in contact with the heating surface to be moved to a location separated from the heating surface.

Additionally in accordance with an embodiment of the invention there is provided domestic food cooking apparatus including a metal heating surface for heating a food product to be prepared and electrical resistance heating apparatus fixedly associated with the heating surface in electrically insulated touching relationship therewith, the electrical resistance heating means comprising a thin layer of an electrical conductive material and at least one layer of an electrical insulative material disposed adjacent each side of the thin layer.

Additionally in accordance with an embodiment of the present invention there is provided self contained domestic food cooking apparatus including a self supporting container for holding a food product to be prepared, heating apparatus operatively associated with the container, stirring apparatus operatively associated with the container and cover apparatus removably attachable to the container, the cover means including stirring drive apparatus for operating the stirring apparatus.

Still further in accordance with an embodiment of the invention there is provided domestic food cooking apparatus including a cooking container, stirring apparatus arranged for operative engagement with the cooking container and a housing containing a base for removably supporting the cooking container, heating apparatus for providing heat to the cooking container, stirring drive apparatus for automatic engagement with the stirring apparatus upon engagement of the cooking container with the base and control apparatus for providing automatic control of the operation of the heating apparatus and the stirring drive apparatus.

Yet further in accordance with an embodiment of the present invention there is provided domestic food cooking apparatus including a container for holding a food product to be prepared and defining a heating surface, the container including at least an outer wall portion and an inner wall portion defining the heating surface and electrical resistance heating apparatus located between the inner wall portion and the outer wall portion in intimate heat transfer engagement with, but electrically insulated from, the inner wall portion.

Additionally in accordance with an embodiment of the invention, there is also provided an inner food holding element associated with the container for supporting food therein. Preferably, the holding element is apertured. The holding element may be driven in reciprocal rotation with respect to the container.

The various features described hereinabove may be combined in any suitable combination in accordance with the present invention.

BRIEF DESCRIPTION OF THE DRAWINGS

The present invention will be understood and appreciated more fully from the following detailed description, taken in conjunction with the drawings in which:

FIGS. 4A, 4B and 4C are illustrations of the engagement of the stirrer and container with the housing at three respective stages: just prior to engagement, upon initial engagement and seating of the container in the housing, and upon driving engagement of the stirrer with the stirrer drive;

FIGS. 17A, 17B and 17C are illustrations of a spring loaded extendible stirrer useful in the invention;

FIGS. 20A is a front view illustration of a stirrer having a two-part side flap bottom portion and FIGS. 20B and 20C illustrate the orientation of the stirrer in motion through a fluid in respective opposite directions;

DETAILED DESCRIPTION OF THE INVENTION

Figure 1:
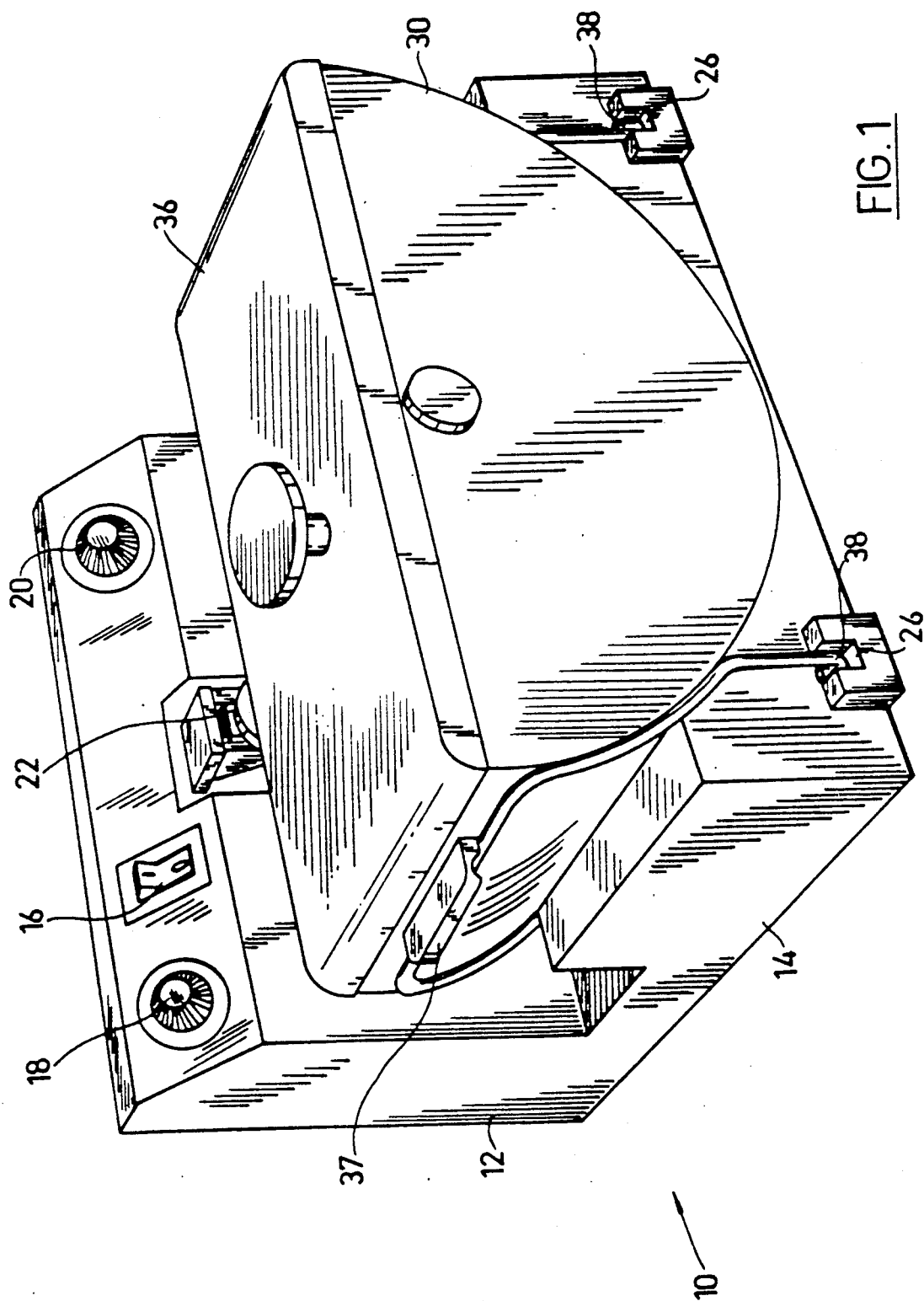
FIG. 1 is a pictorial illustration of domestic food cooking apparatus constructed and operative in accordance with a preferred embodiment of the present invention.
Figure 2:
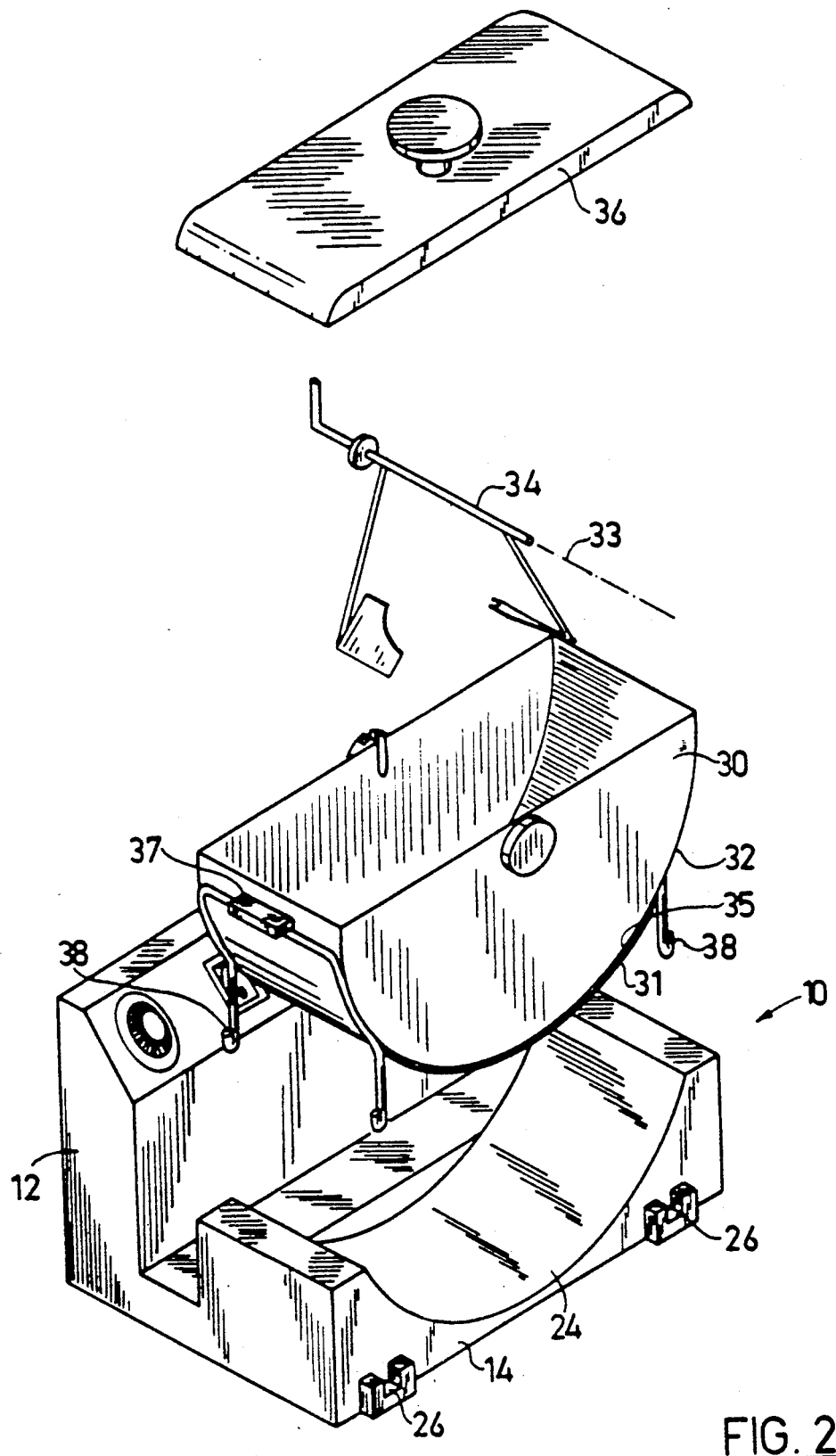
FIG. 2 is an exploded view illustration of the apparatus of FIG. 1.

Reference is now made to FIGS. 1 and 2, which illustrate heating apparatus constructed and operative in accordance with a preferred embodiment of the present invention and comprising a housing 10, including a back portion 12 and a base portion 14. The back portion comprises various controls, such as an on-off control switch 16, a heating temperature control knob 18 and a timer control knob 20. Also mounted on back portion 12 is a stirrer engagement portion 22 of a reciprocal drive assembly, which is not seen in FIGS. 1 and 2, insofar as it is located at the interior of back portion 12.

The base portion 14 defines a curved support 24, typically formed of a metal or plastic and preferably being of a generally uniform width. A plurality of retaining sockets 26 are preferably arranged on either side of the curved support surface 24.

A cooking container 30 is arranged to be removably supported on curved support 24. The cooking container 30 is configured to have a curved bottom surface 32 of generally uniform width, typically greater than the width of curved support 24. Preferably the curvature of bottom surface 32 is generally circular and the surface is arranged to lie about an axis which is collinear with or adjacent to and slightly below the axis of rotation 33 of a stirrer 34. A cover 36 may be provided for container 30. Handles 37 are preferably provided on the two ends of the container 30.

Figure 5:
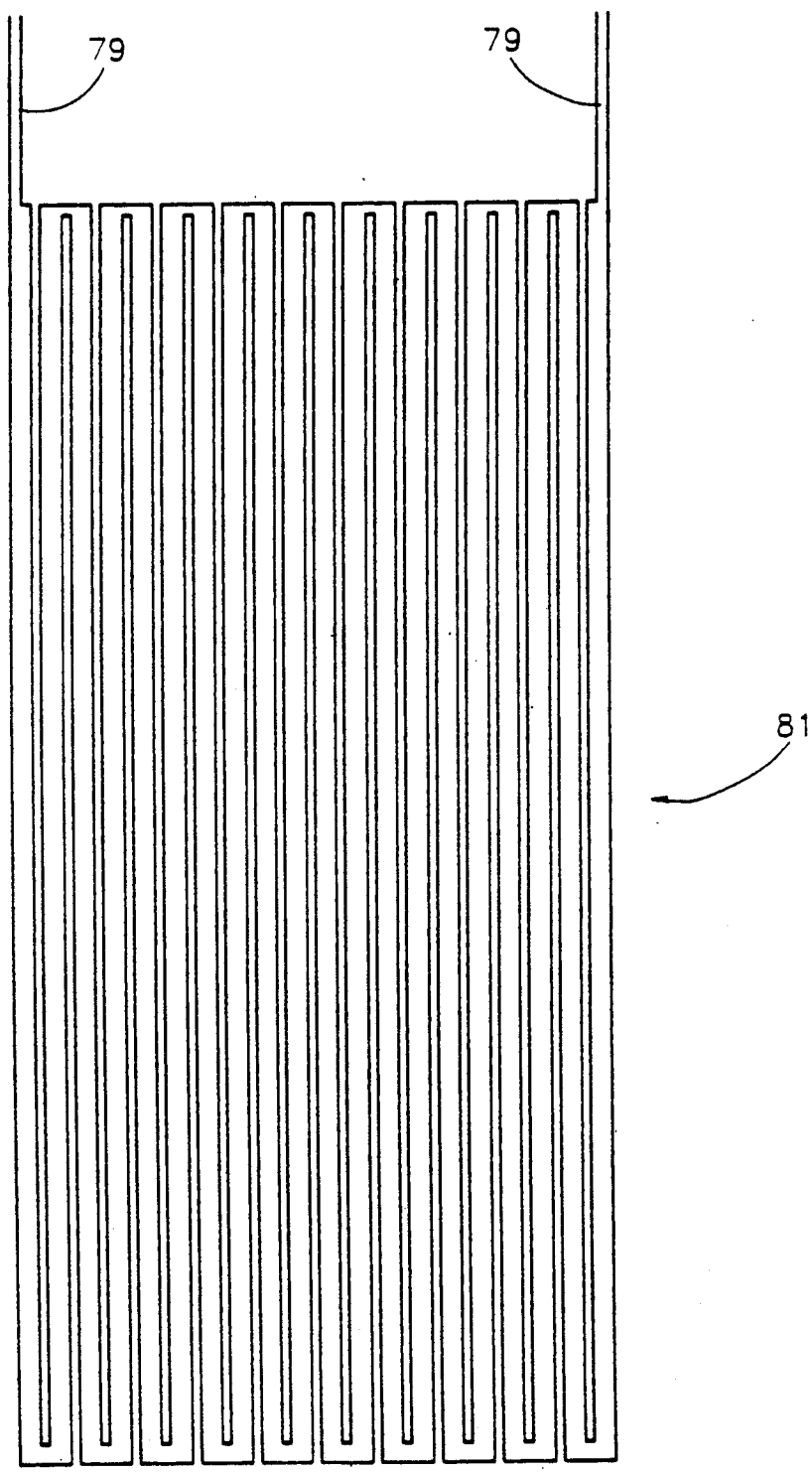
FIG. 5 is a plan view of a heating element constructed and operative in accordance with a preferred embodiment of the invention.
Figure 6A:
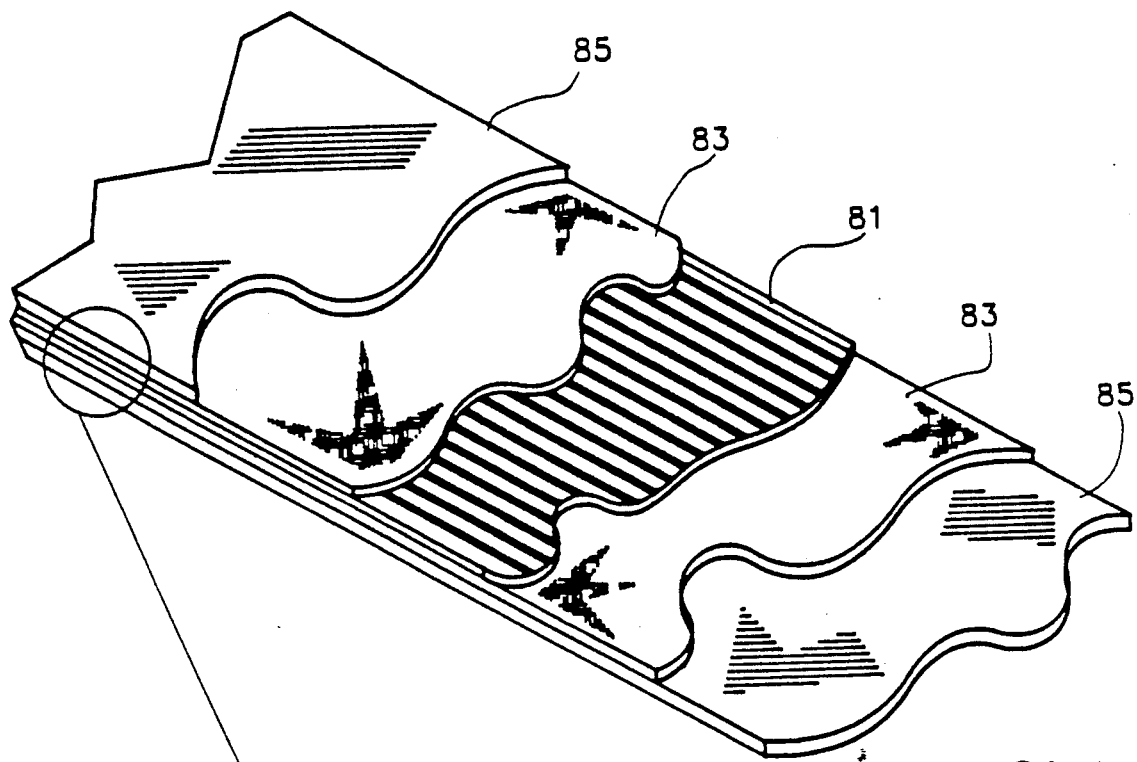
FIG. 6A is combination peeled-away and sectional illustration of a portion of the heating element of FIG. 5.

Electrical heating apparatus, preferably such as that shown in FIG. 6A, preferably is located within a sealed double walled portion 31 of container 30 and is arranged to provide generally uniform heating of a heating surface 35 of the container, which is generally coextensive with the overall extent of the electrical heating apparatus. A preferred embodiment of electrical heating apparatus is described hereinbelow with reference to FIGS. 5, 6A and 6B.

Figure 6B:
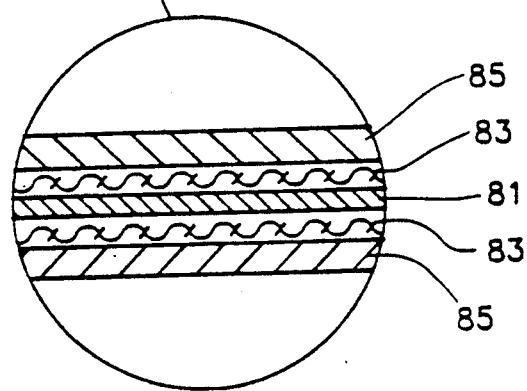
FIG. 6B is a partially cut away illustration of the heating element of FIG. 5 incorporated in the container of the apparatus of FIGS. 1 and 2.
Figure 6C:
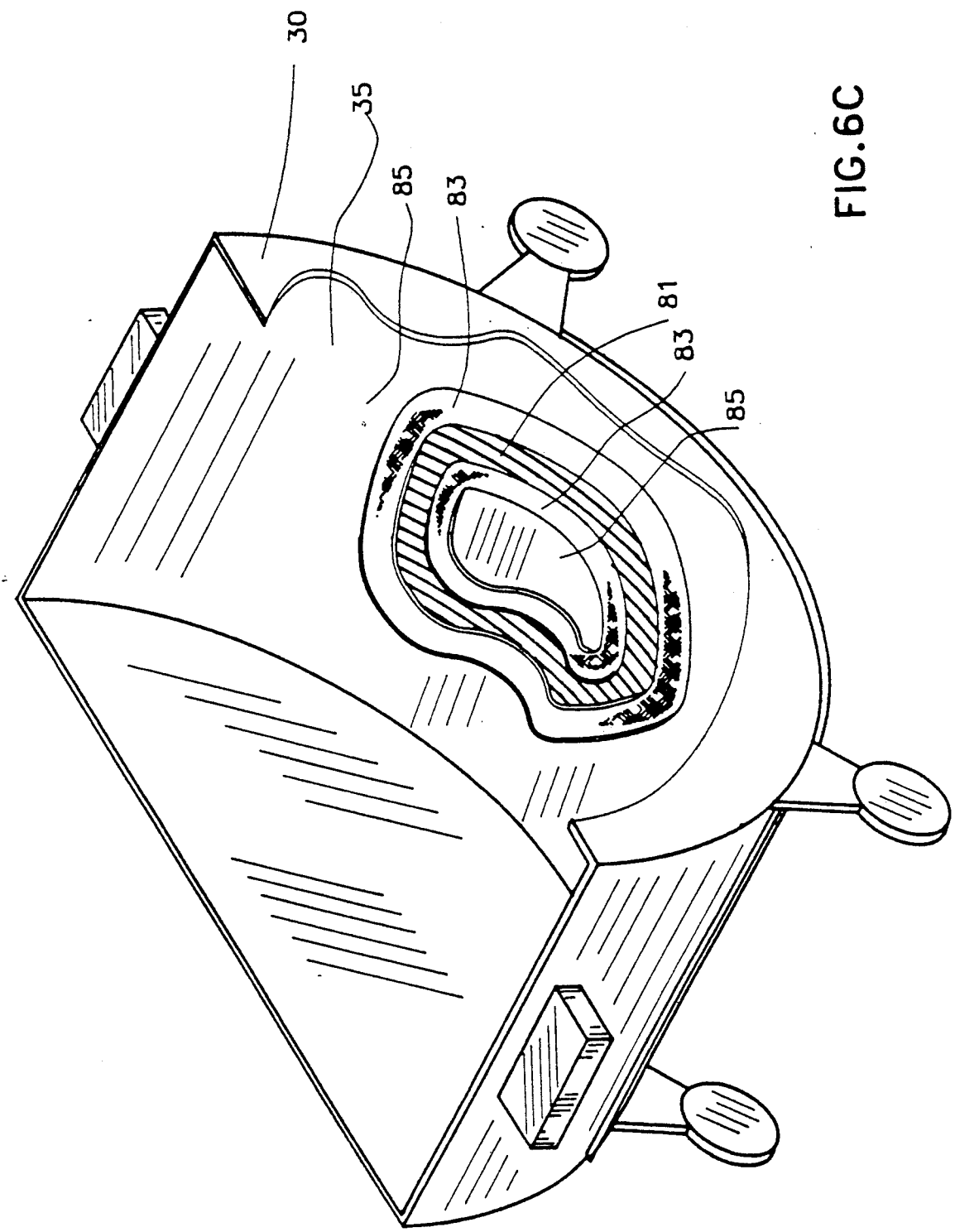

Referring now to FIGS. 5, 6A and 6B there is illustrated a portion of an electrical heating element assembly which is particularly useful in the present invention. The heating element assembly comprises a heating element 81 preferably in the form of a relatively thin foil of a metal, of typical thickness 0.05 mm, which is configured, as illustrated, for example in FIG. 5, to define an elongate electrical resistance heating element having terminals 79 for connection to a source of electrical power via a suitable power interconnect.

Preferably, element 81 has a high surface coverage density, typically in excess of 50% and preferably in excess of 80%, so as to provide very homogeneous heating of a heating surface to which it is thermally coupled. Element 81 is also selectably configurable and is preferably configured so as to conform to heating surface 35 of container 30 in order to provide homogeneous efficient heating thereof.

Figure 30:
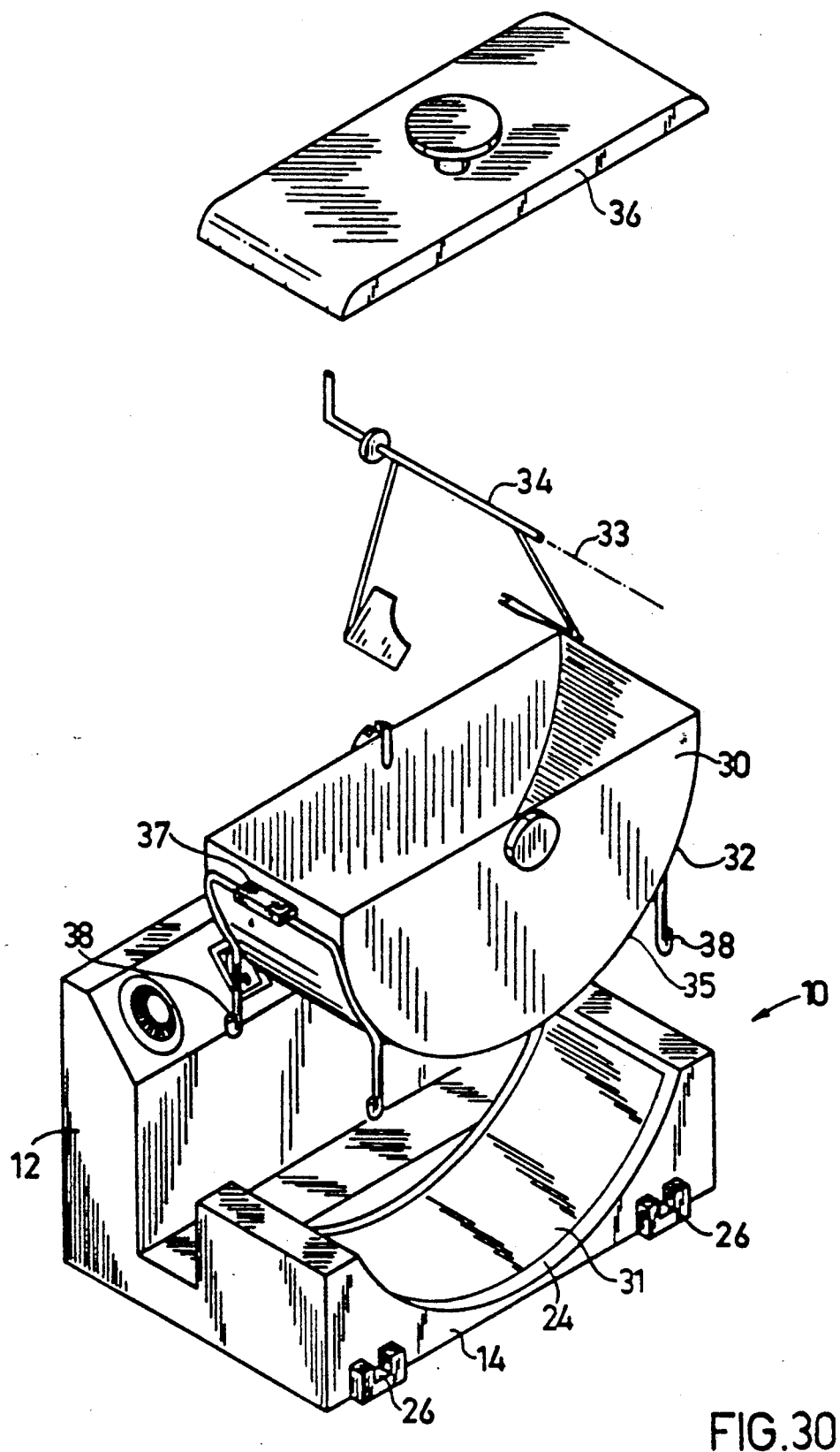
FIG. 30 is an exploded view illustration of apparatus similar to that of FIGS. 1 and 2 but wherein a heating element is fixedly associated with the base, rather than with the container.

As seen in FIG. 6A, the heating element 81, described above, is located in touching engagement on both sides thereof with a layer of a dielectric material 83, such as a mica or Fiberglas sheet. Alternatively other suitable dielectric materials may be used. Disposed on the outside surfaces of dielectric layers 83 are metal plates 85, typically formed of stainless steel of thickness 0.6 mm. One of metal plates 85 may serve as the heating surface 35, as illustrated in FIG. 6B. According to an alternative embodiment of the invention, illustrated in FIG. 30, the entire heating element assembly may be incorporated as part of the housing or base on which the container rests when in use.

According to a preferred embodiment of the invention, the heating container 30 is engaged with the base portion 14 of the housing 10 from above by a vertical movement. The precise positioning and upright orientation of container 30 with respect to base portion 14 may be provided by any suitable means. In the illustrated embodiment of FIGS. 1 and 2, there are provided positioning protrusions 38 which are attached at the two ends of the container 30. Protrusions 38 are configured to seat in retaining sockets 26 when the container 30 is seated on the base portion 14.

According to an alternative embodiment of the present invention, protrusions 38 may provide not only positioning but also support for the container 30 on base portion 14.

According to a preferred embodiment of the present invention, protrusions 38 also serve as support legs for the container for maintaining it in a generally upright orientation on any flat surface.

Reference is now made additionally to FIGS. 3 and 4A-4C which illustrate the stirrer 34 and the mounting thereof in greater detail. The stirrer 34 may be of any suitable configuration so long as it is arranged to travel generally along the curvature of the bottom surface 32 of the container, in spaced or touching relationship therewith.

In the illustrated embodiment, the stirrer is preferably of the type illustrated in detail in FIGS. 10A-10C and described in connection therewith hereinbelow. The stirrer travels along the curvature of the bottom surface 32 of the container, in spaced or touching relationship therewith, as suitable for each given application. The stirrer includes a main shaft 40 which is free at an extreme end 46 and at a near end 48 is provided with a locating disk 50, whose function will be described hereinbelow.

Inwardly of the locating disk 50, the main shaft 40 is formed with a right angled portion 52 whose function is driven engagement with the reciprocal drive assembly which will be described hereinbelow.

Container 30 is associated with a first stirrer socket 54, arranged to accept the extreme end 46 of main shaft 40. Container 30 is also associated with a second stirrer socket 56. As illustrated, second stirrer socket 56 is provided with a first recess portion 58 having a relatively broad top opening 60 sufficient to permit passage of locating disk 50 and a second recess portion 62, located inwardly with respect to recess portion 58, and which has a relatively narrow top opening 64, sufficient only to permit passage of main shaft 40. Second recess portion 62 is sized to accommodate locating disk 50 and to permit rotation thereof, but without permitting significantly displacement thereof along axes perpendicular to axis 33.

Figure 3:
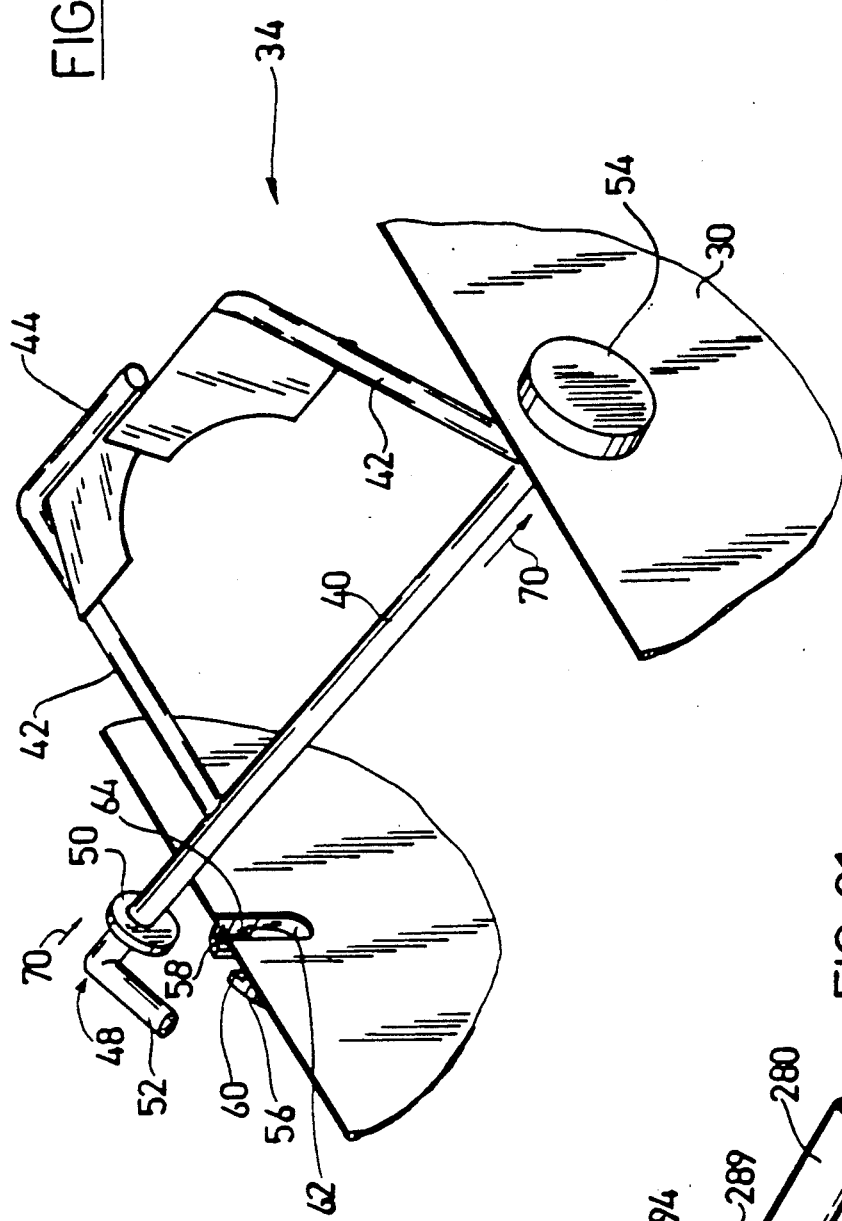
FIG. 3 is a generalized view showing the engagement of the stirrer with the container forming part of the apparatus of FIGS. 1 and 2.

FIG. 3 illustrates typical initial engagement of the stirrer 34 with container 30. The extreme end 46 is partially inserted into socket 54 and the locating disk 50 is inserted into first recess portion 58 of socket 56 via top opening 60.

Thereafter, the stirrer 34 is moved axially in a direction indicated by arrow 70 until the extreme end 46 is fully seated in socket 54. It is appreciated that when the extreme end 46 is fully seated in socket 54, it cannot be disengaged from the container 30 except by first being moved axially in a direction opposite to arrow 70 and is thus retained against accidental and unwanted disengagement.

Figure 7:
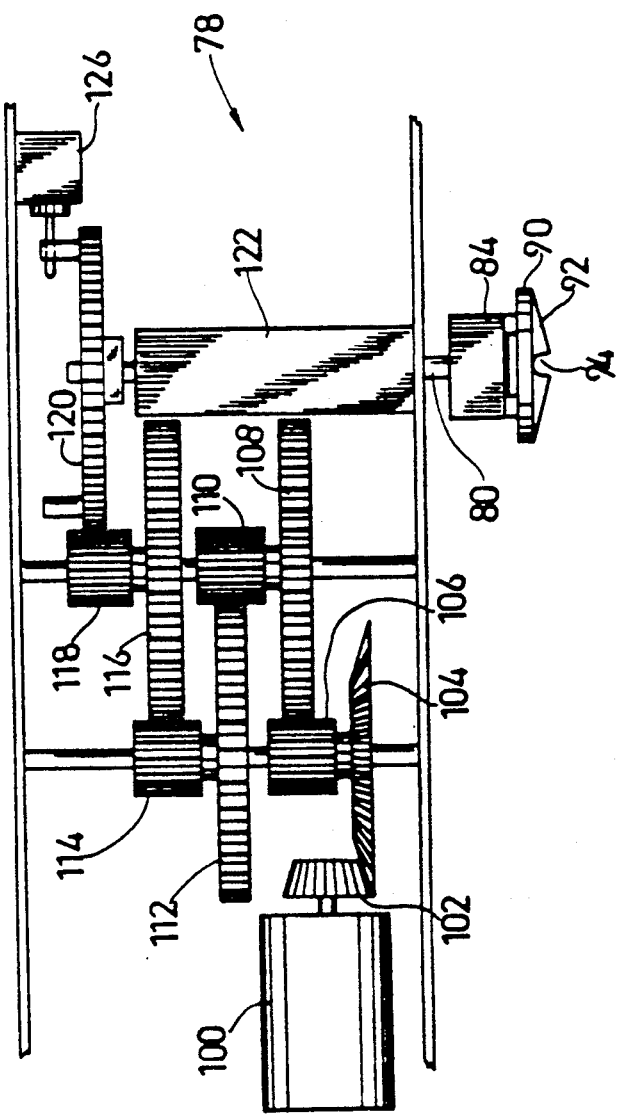
FIG. 7 is an illustration of typical reciprocal drive apparatus useful in the apparatus of FIGS. 1 and 2.

Reference is now made to FIGS. 4A-4C and 7, which illustrate engagement of the stirrer right angled portion 52 with the reciprocal drive assembly. The reciprocal drive assembly, typically as illustrated in FIG. 7 and indicated generally by reference numeral 78, has an output shaft 80.

Fixedly mounted onto output shaft 80 is a pivot support member 84 which defines a pivot axis 86. Pivotably mounted onto pivot axis 86 is a stirrer engagement member 90 having formed on an axially forward generally conical face 92 thereof an elongate slot 94, configured to accommodate therewithin the right angled portion 52 of stirrer 34 for reciprocal driving thereof.

Figure 4B:
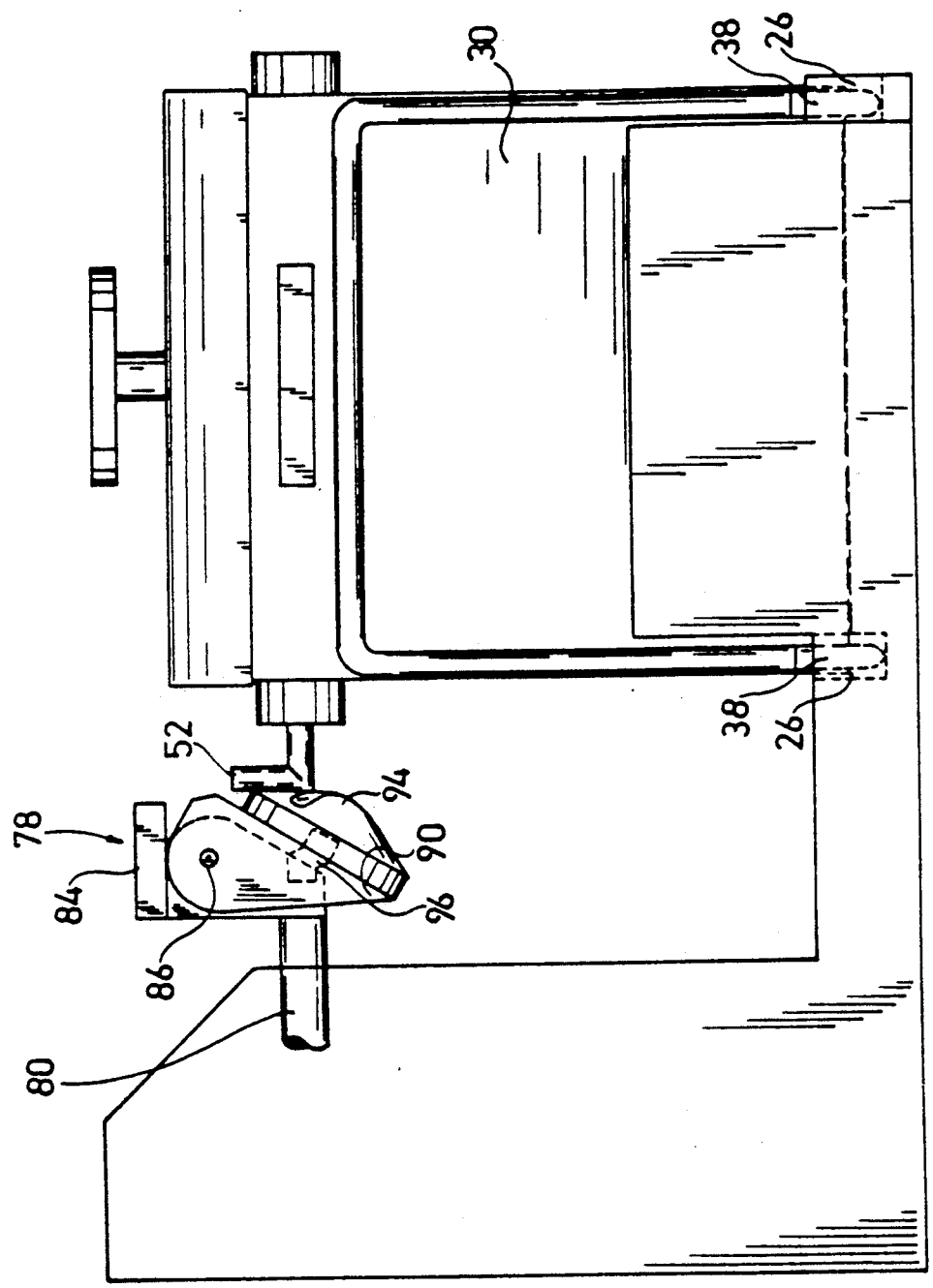

A compression spring 96 is disposed between members 84 and 90 for urging member 90 into an extended orientation, generally as illustrated in FIGS. 4A and 4C, but permitting rotation of member 90 about axis 86 to an orientation such as that shown in FIG. 4B, in circumstances as will be described hereinbelow.

Engagement of the container 30 and stirrer 34 mounted thereon with the reciprocating drive assembly 78 will now be described with reference to FIGS. 4A-4C. FIG. 4A illustrates a situation prior to engagement, wherein the container 30 is located above and out of engagement with support surface 24 and the right angled portion 52 is located above and out of engagement with stirrer engagement member 90. FIG. 4B illustrates a situation wherein the container 30 is seated on support surface 24 and where the right angled portion 52 engages the stirrer engagement member 90 but is not seated within the slot 94.

It is assumed for the purposes of this description that the right angled portion 52 is not entirely lined up with the slot 94 so that right angled portion 52, as it moves downward together with the container 30, forces member 90 to pivot about axis 86, thus compressing spring 96, as illustrated, and permitting uninterrupted seating of the container 30 on support surface 24.

FIG. 4C illustrates the situation when the container 30 is fully seated on support surface 24 and wherein relative rotation between the stirrer 34 and the member 90 has taken place such that right angled portion 52 has seated in slot 94, as illustrated. This relative rotation may be produced either by initial operation of the reciprocal drive apparatus 78 or by manual rotation of the stirrer 34 about axis 33.

It will be appreciated by persons skilled in the art that the apparatus shown in FIGS. 4A-4C enables automatic engagement of the stirrer with the reciprocating drive assembly 78 independent of the relative rotational orientations of the stirrer 34 and the stirrer engagement member 90.

Figure 8:
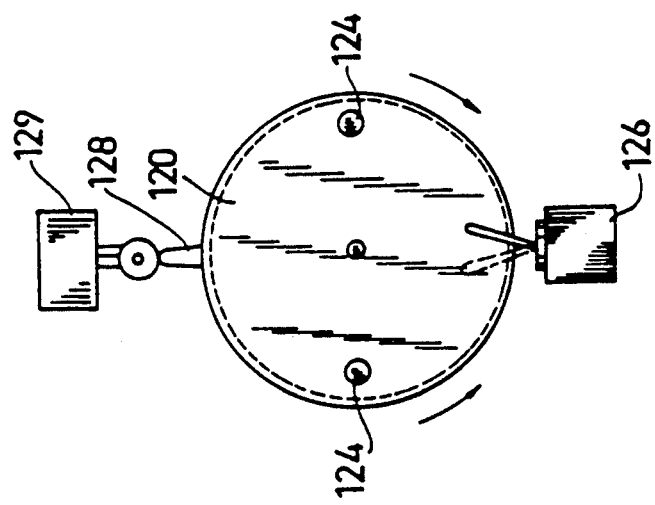
FIG. 8 is an illustration of switch apparatus employed in the apparatus of FIG. 7.

Reference is now made briefly to FIGS. 7 and 8 which illustrate a reciprocal drive assembly useful in the apparatus of FIGS. 1-6B. The assembly comprises an electric motor 100 having associated with the output shaft thereof a conical gear 102. Gear 102 engages a reducing conical gear 104 to which is coupled a cylindrical gear 106 for rotation together therewith. Gear 106 is engaged by a reducing gear 108 to which is coupled a cylindrical gear 110 for rotation together therewith. Gear 110 is engaged by a reducing gear 112 to which is coupled a cylindrical gear 114 for rotation together therewith. Gear 114 is engaged by a reducing gear 116 to which is coupled a cylindrical gear 118 for rotation together therewith. Gear 118 is engaged by a gear 120 which drives output shaft 80 via bearing assembly 122.

As described above in connection with FIGS. 4A-4C, fixedly mounted onto output shaft 80 is pivot support member 84 which defines pivot axis 86. Pivotably mounted onto pivot axis 86 is stirrer engagement member 90 having formed on axially forward face 92 thereof elongate slot 94, configured to accommodate therewithin the right angled portion 52 of the stirrer 34 for rotational driving thereof.

As illustrated in FIG. 8, there are formed on gear 120 a pair of protrusions 124 which are typically separated by 180 degrees and are arranged for operative engagement with a microswitch 126, which is operative to change the direction of rotation of electric motor 100, thus providing desired reciprocation. It is appreciated that any other suitable reciprocal drive apparatus may alternatively be employed. Such apparatus may or may not require the use of a microswitch 126 or its equivalent.

There may also be formed onto gear 120 a radially extending protrusion 128, which is arranged to operatively engage a microswitch 129 when gear 120 is in a given position, which is preferably selected to correspond to a vertical orientation of slot 94 (FIG. 7). Microswitch 129 is normally closed and is opened only when operatively engaged by protrusion 128, as illustrated in FIG. 8.

Figure 9:
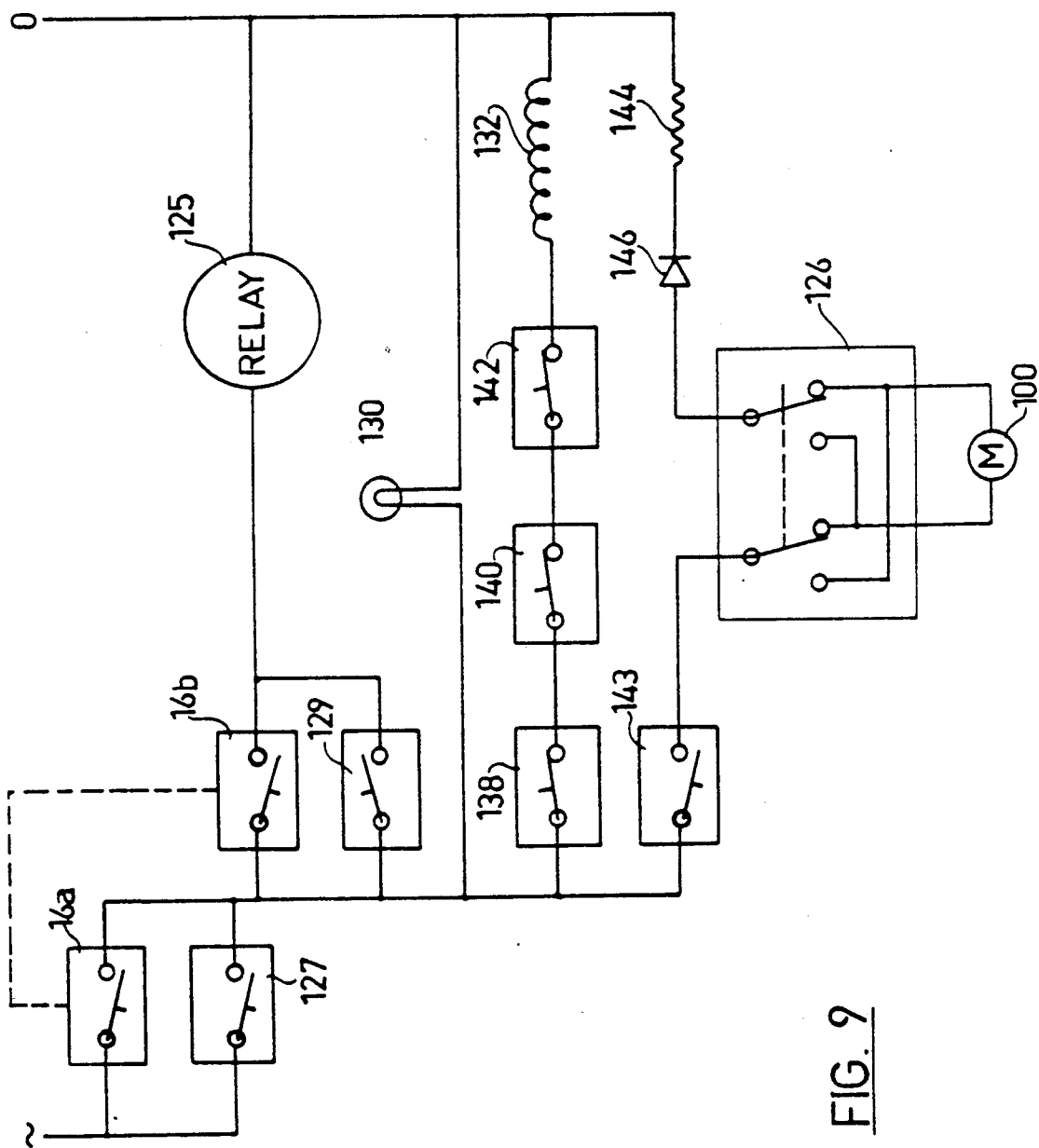
FIG. 9 is an electrical diagram of typical electrical connections in the apparatus of FIGS. 1 and 2.

Reference is now made to FIG. 9, which illustrates typical electrical connections for the apparatus of FIGS. 1 and 2, it being appreciated that FIG. 9 is applicable as well to alternative embodiments of the invention described hereinbelow. The apparatus of FIGS. 1 and 2 is connected to the mains via a line cord (not shown) and an on-off control switch 16 (FIG. 1) which has two contacts 16a and 16b, as shown in FIG. 9. Arranged in parallel with contact 16a is a relay controlled contact 127, which is normally open. Arranged in parallel with contact 16b is microswitch 129 (FIG. 8). A relay 125 is coupled between contacts 16b and switch 129 and the mains as shown. Closure of switch 16 actuates relay 125.

A light 130 may be provided to indicate that power is being supplied to the apparatus. The light 130 may be employed to illuminate switch 16.

Electrical resistance heating apparatus 132 is connected across the mains in series with contact 16a and further in series with an adjustable thermostat controlled switch 138, operated by knob 18 (FIG. 1), a timer controlled switch 140, operated by knob 20 (FIG. 1) and a safety cut-off switch 142.

Electric motor 100 (FIG. 7) is connected to the mains via contact 16a and switch 127 and in series with a normally open relay controlled contact 143 and with a resistance 144 and a diode 146 and microswitch 126 (FIG. 8), which governs the direction of rotation of motor 100.

The operation of the apparatus of FIGS. 7 and 8 and 9 is summarized as follows: When the user turns on the apparatus by closing switch 16, contacts 16a and 16b close, thus actuating relay 125. The operation of relay 125 closes contacts 127 and 143. The motor 100 then operates.

If the user then turns off the apparatus by opening switch 16, relay 125 continues to be actuated via contacts 127 and 129 until the slot 94 is oriented generally vertically. Once slot 94 is generally vertical, so as to permit ready disengagement of the stirrer therefrom, switch 129 is actuated by protrusion 128, thus deactuating relay 125 and thus causing contacts 127 and 143 to open, stopping the motor at the desired orientation of slot 94.

Figure 10A:
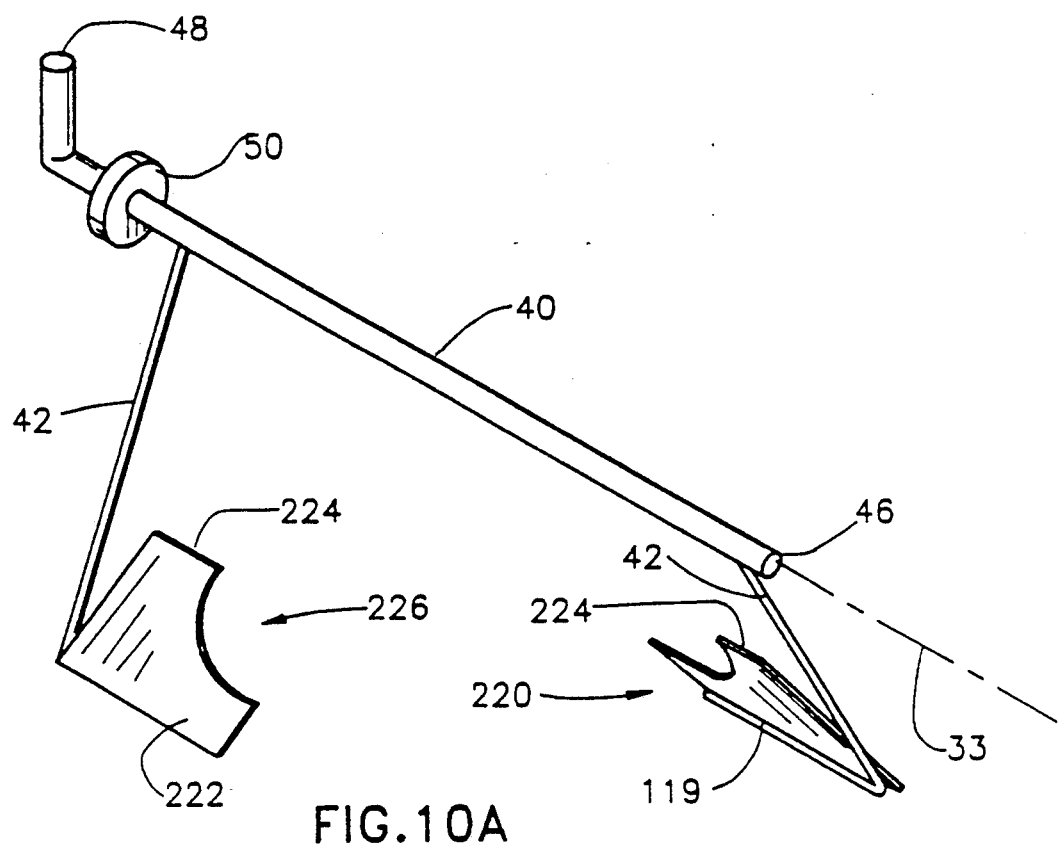
FIGS. 10A, 10B and 10C are respective pictorial, side view and end view illustrations of a stirrer apparatus constructed and operative in accordance with a preferred embodiment of the present invention.
Figure 10B:
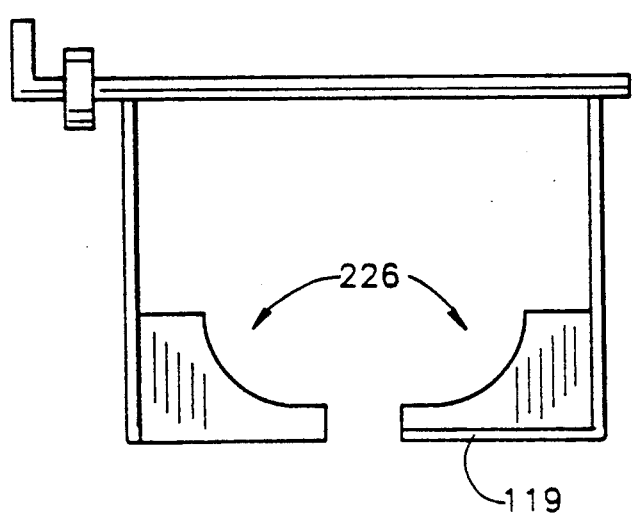
Figure 10C:
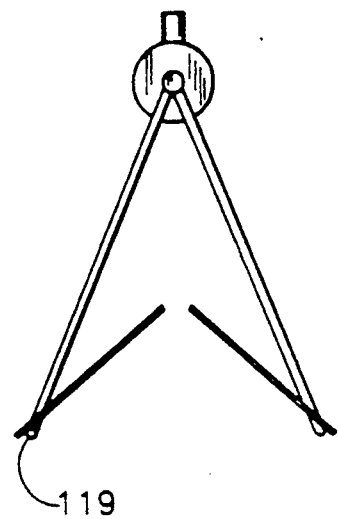

Reference is now made to FIGS. 10A, 10B and 10C which illustrate a stirrer constructed and operative in accordance with a preferred embodiment of the present invention. The stirrer typically comprises a main shaft 40 from which extend two rods 42, the main shaft having an extreme end 46, a near end 48 and a locating disk 50. The rods 42 extend at different angles in directions perpendicular to rotation axis 33. Each of rods 42 includes an angled portion 119 onto which is mounted an inwardly directed planar element 220.

As seen clearly in FIGS. 10A-10C, planar elements 220 are typically slanted at opposite angles with respect to rods 42, so as to define preferably an angle of 90 degrees between the respective planes of elements 220.

According to the illustrated preferred embodiment, the elements 220 are formed to have a relatively broad base portion 222 and a narrowed upper portion 224. This configuration may be achieved by configuration elements 220 to have matching cut-outs 226 as shown or in any other suitable manner.

Elements are preferably configured and spaced from each other such that for each direction of motion about axis 33, one of the two elements 220 engages food products lying along a portion of the container surface and lifts them away from that surface. This operation will now be described in connection with FIGS. 11A-11D, 22, 23 and 24.

Referring now to FIGS. 11A-11D, there is seen a series of illustrations of the operation of the present invention providing reciprocal stirring using a stirrer 230 of the type illustrated in FIGS. 10A-10D. In all of the illustrations, the stirrer 230 moves in the direction indicated by arrow 232 through a mass of discrete elements 233, such as nuts, disposed in container 30.

Figure 11A:
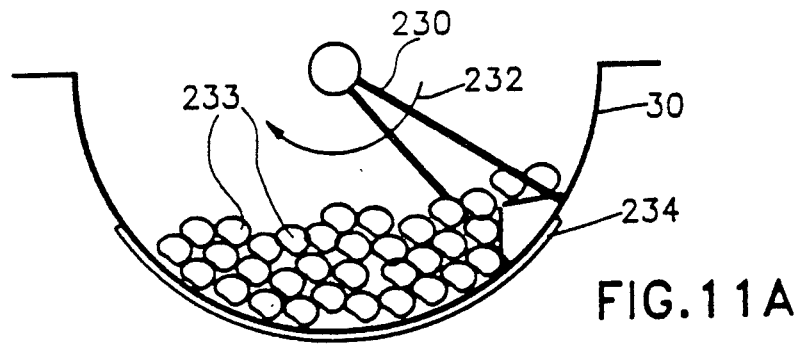
FIGS. 11A, 11B, 11C and 11D are pictorial illustrations of four stages in stirring using the apparatus of FIG. 1 and the stirrer of FIGS. 10A-10D.
Figure 11B:
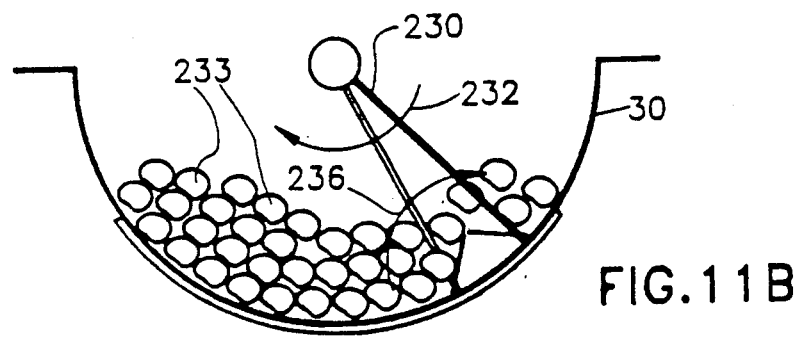
Figure 11C:
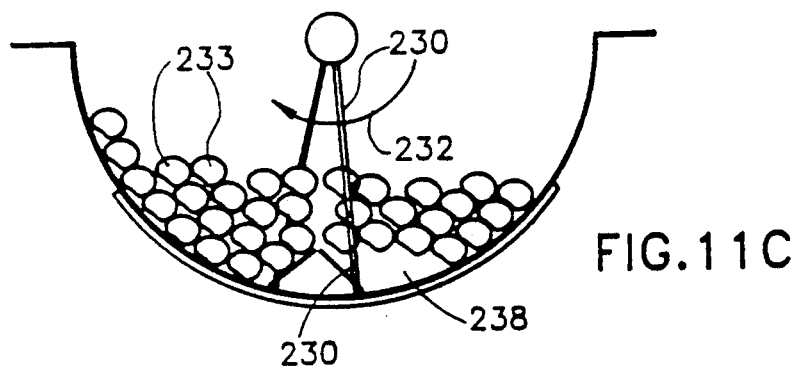
Figure 11D:
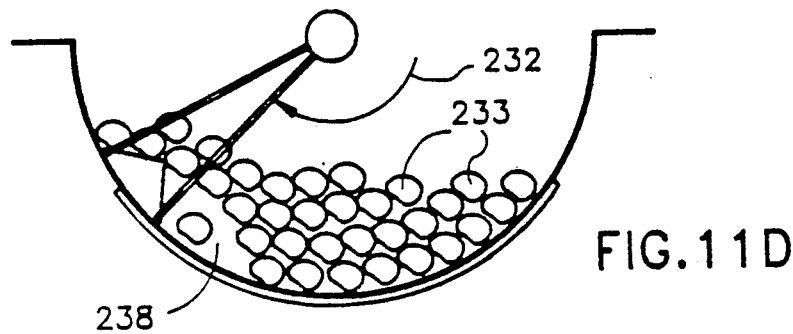

In FIG. 11A, the stirrer is shown as it begins to move along a heated surface 234. In FIG. 11B it is seen that the stirrer causes the elements to move up and away from the heated surface 234 in a direction indicated generally by an arrow 236. FIG. 11C illustrates an empty volume 238 which tends to form behind the stirrer 230 and FIG. 11D illustrates the stirrer 230 as it reaches a level beyond the heated surface 234 and also beyond the normal level of the elements 233 in the container 230. It is seen that the elements 233 in front of the stirrer tend to move from contact with the heated surface 234 to the top of the pile of elements 233 and thus away from the heated surface 234. It may be appreciated that an efficient circulation of elements to be heated from contact with the heating surface to a location out of such contact is thus produced by the invention.

Figure 22:
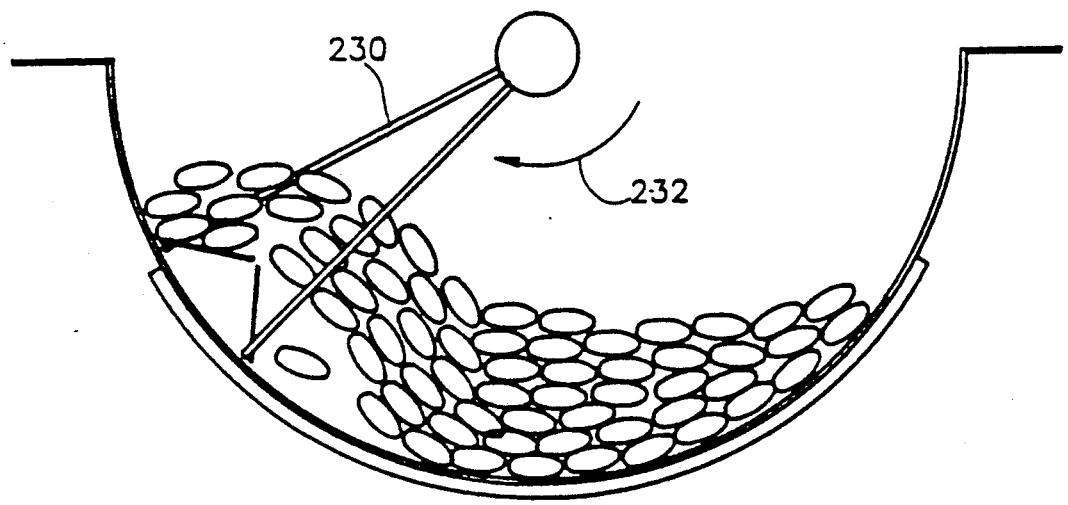
FIG. 22 is a pictorial illustration of the operation of the stirrer of FIGS. 10A-10C in reaching a level above the level of the food product being prepared.

FIG. 22 is a pictorial illustration of the flow of bulk materials in accordance with the invention and particularly of an embodiment of the invention wherein the stirrer raises the bulk materials above their normal level and thus enhances the circulation thereof. In FIG. 22 it is also seen that the stirrer 230 reaches a level above the normal level of the bulk materials in the container 30.

Figure 23:
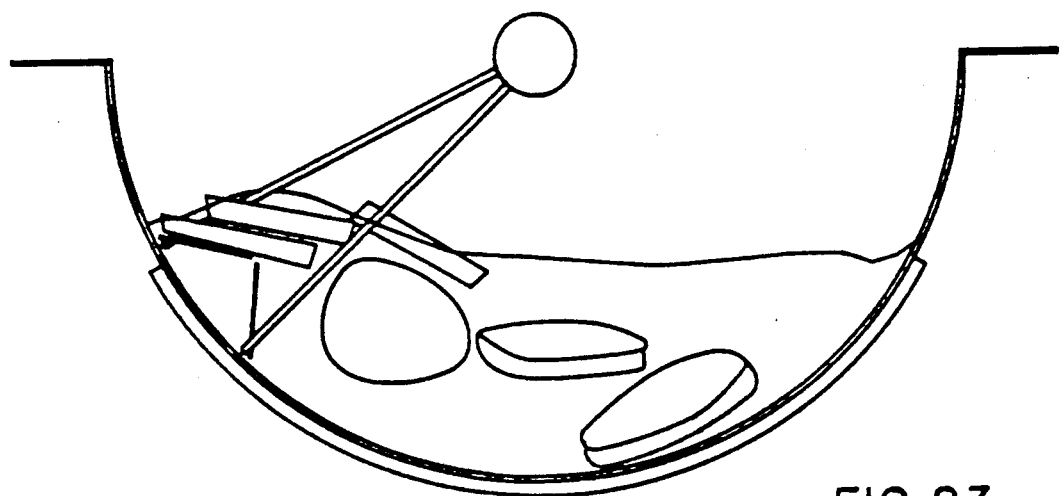
FIG. 23 is a pictorial illustration of the operation of the stirrer of FIGS. 10A-10C in pushing the food product above its normal level.

FIG. 23 illustrates the stirring of solid items in a liquid and illustrates how the stirrer causes a portion of the liquid and the solid materials therein to rise above the normal level of the liquid, thus enhancing the circulation thereof. Here, the stirrer remains below the normal level of the liquid.

Figure 24:
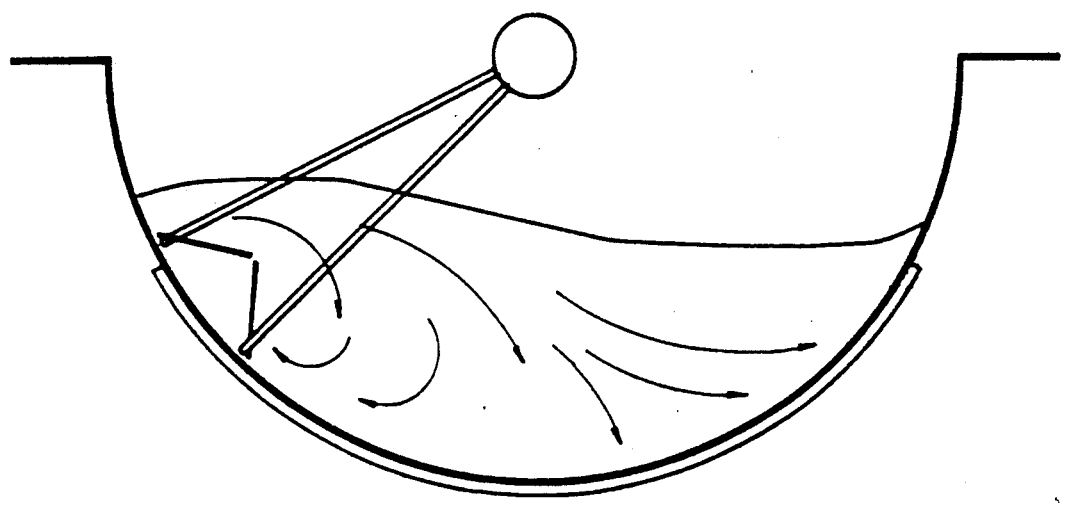
FIG. 24 is a pictorial illustration of the operation of the stirrer of FIGS. 10A-10C in stirring a liquid food product.

FIG. 24 is a general illustration of the flow directions typically produced in a liquid due to operation of the present invention in a reciprocal stirring mode. It may be appreciated that a relatively highly efficient top-to-bottom and bottom-to-top type of circulation is produced.

Figure 12:
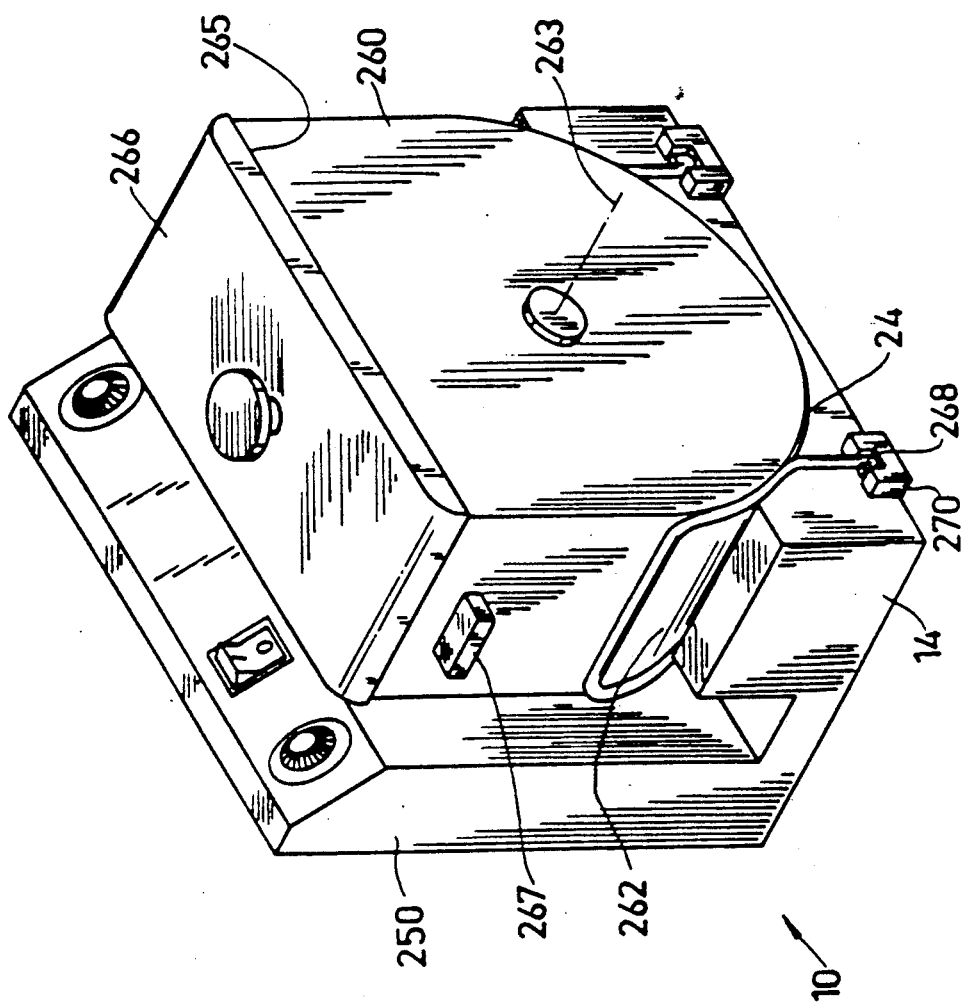
FIG. 12 is a pictorial illustration of domestic food cooking apparatus constructed and operative in accordance with a further alternative preferred embodiment of the present invention.
Figure 13:
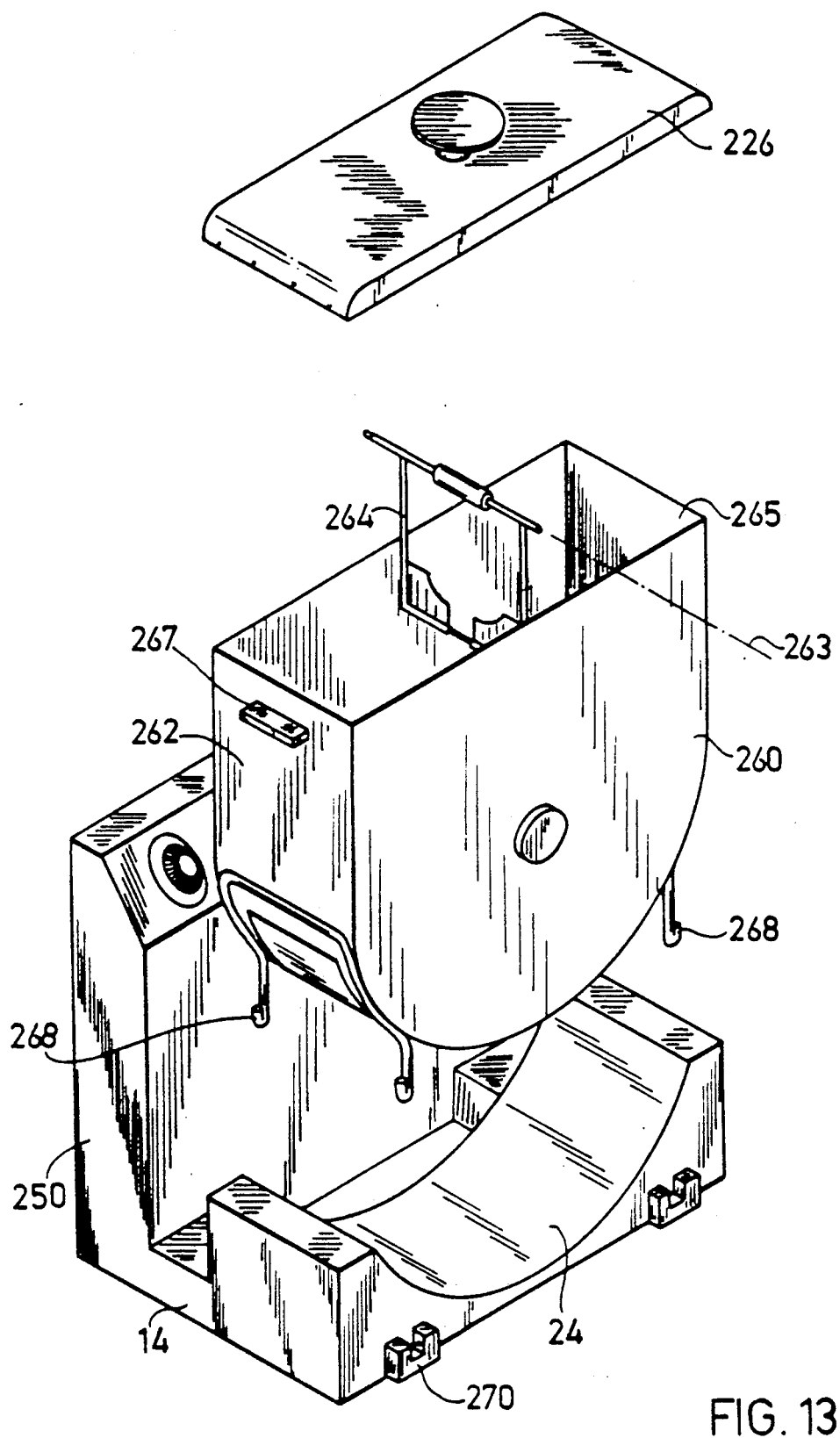
FIG. 13 is an exploded view illustration of the apparatus of FIG. 12.

Reference is now made to FIGS. 12 and 13, which illustrate heating apparatus constructed and operative in accordance with an alternative embodiment of the present invention and comprising a housing 10, including a base portion 14, which may be essentially identical to that shown in FIGS. 1 and 2, and a back portion 250. Back portion 250 is essentially identical to that shown in FIGS. 1 and 2, except that the positions of various operator controls are shown raised.

A cooking container 260 is configured to have a configuration which is larger than a full circle and to have a curved peripheral edge surface 262 of generally uniform width, typically greater than the width of curved support and heating surface 24. Preferably the curvature of peripheral surface 262 is circular and is arranged to lie coaxially about the axis of rotation 263 of a stirrer 264 which, due to the configuration of container 260 may be driven in full 360 degree rotation.

Container 260 is typically provided with an access opening 265 at the top thereof. A cover 266 may be provided for removable sealing engagement with container 260 at opening 265. Handles 267 are preferably provided on the two ends of the container 260.

According to the illustrated embodiment of the invention, the heating container 260 is engaged with the base portion 14 of the housing 10 from above by a vertical movement. In the illustrated embodiment, the precise positioning and upright orientation of container 260 with respect to base portion 14 may be provided by positioning protrusions 268 which are attached at the two ends of the container 260. Protrusions 268 are configured to seat in retaining sockets 270 when the container 260 is seated on the base portion 14.

According to a preferred embodiment of the present invention, protrusions 268 also serve as support legs for the container for maintaining it in a generally upright orientation on any flat surface.

Figure 21:
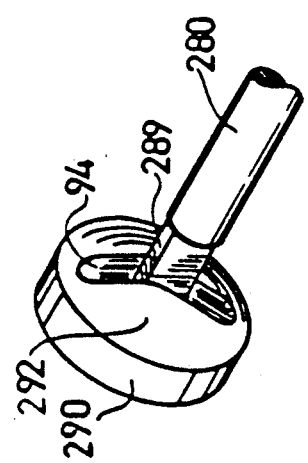
FIG. 21 is an illustration of the operative engagement of the stirrer of FIG. 16 with reciprocal drive apparatus of the type illustrated in FIGS. 1 and 2 and employed in the embodiment of FIGS. 12 and 13.
Figure 16:
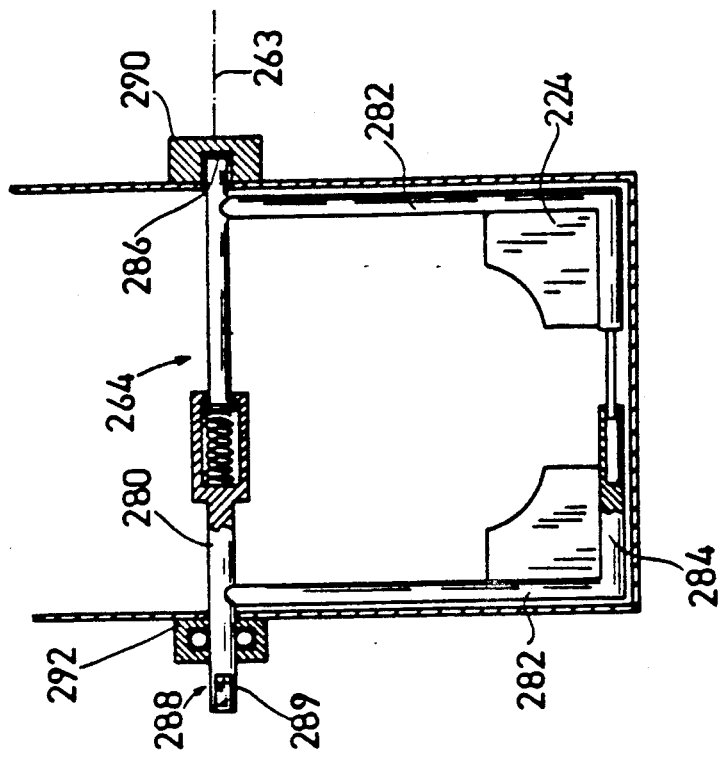
FIG. 16 is a pictorial illustration of a stirrer employed in the apparatus of FIGS. 12 and 13.

Reference is now made additionally to FIGS. 16 and 21 which illustrate the stirrer 264 and the mounting thereof in greater detail. The stirrer 264 may be of any suitable configuration so long as it is arranged to travel generally along the curvature of the peripheral edge surface 262 of the container, in spaced or touching relationship therewith.

In the illustrated embodiment, the stirrer comprises a two-part spring loaded main shaft 280 from which extend two rods 282, each formed with inner facing right angle portions 284. Portions 284 together define an extendible partial cross bar, which travels generally along the circular curvature of the peripheral surface 262 of the container, in spaced or touching relationship therewith, as suitable for each given application. It is seen that preferably there are associated with portions 284 planar portions 224 which may be similar or identical to those illustrated in FIGS. 10A–10C and described hereinabove.

The main shaft 280 is free at an extreme end 286 and at a near end 288 is provided with a flattened insert portion 289 which operatively engages slot 94 of a drive assembly such as that shown in FIG. 7. In such a case the drive assembly may be constructed either with or without the reciprocal switching apparatus incorporating microswitch 126, inasmuch as reciprocal driving may not be required since the container 260 can accommodate full 360 degree rotation of the stirrer 264.

It is a particular feature of the structure of stirrer 264 that it can be inserted and removed from the interior of container 260 via opening 265 by virtue of the spring loading and telescoping construction thereof. Accordingly, the stirrer 264 can be removably located with extreme end 286 in a socket 290, which is fixedly associated with or integrally formed with container 260, and with the near end 288 extending through a liquid sealing socket 292 for engagement with drive apparatus, as illustrated in FIG. 21.

It is a particular feature of the embodiment of FIGS. 12 and 13 that the stirrer may be operated in continuous or reciprocal modes.

Figure 14:
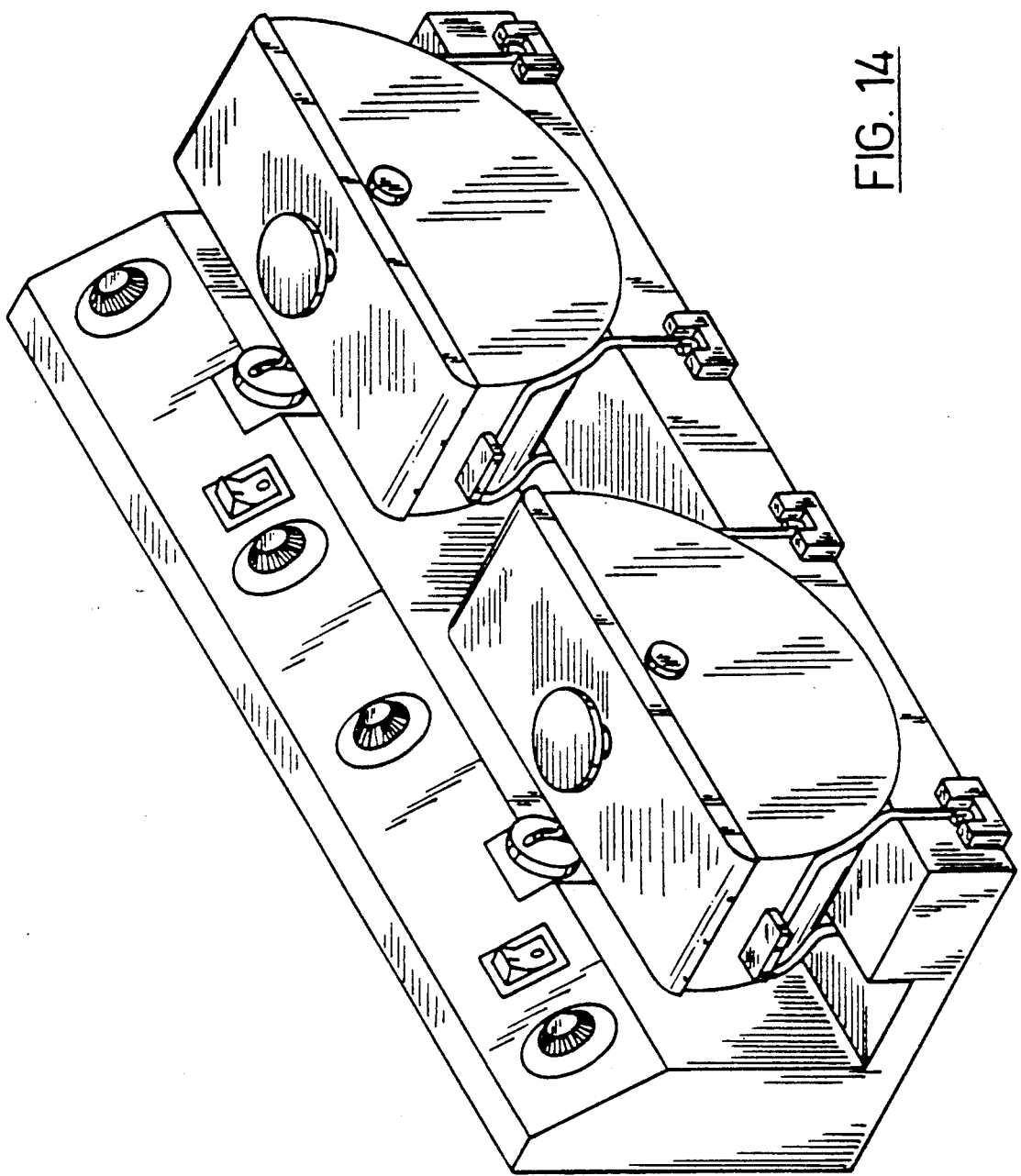
FIG. 14 is a pictorial illustration of domestic food cooking apparatus constructed and operative in accordance with a further alternative preferred embodiment of the present invention.

Reference is now made to FIG. 14, which illustrates a double container version of the apparatus of FIG. 1. Each container may be operated independently of the other.

Figure 15A:
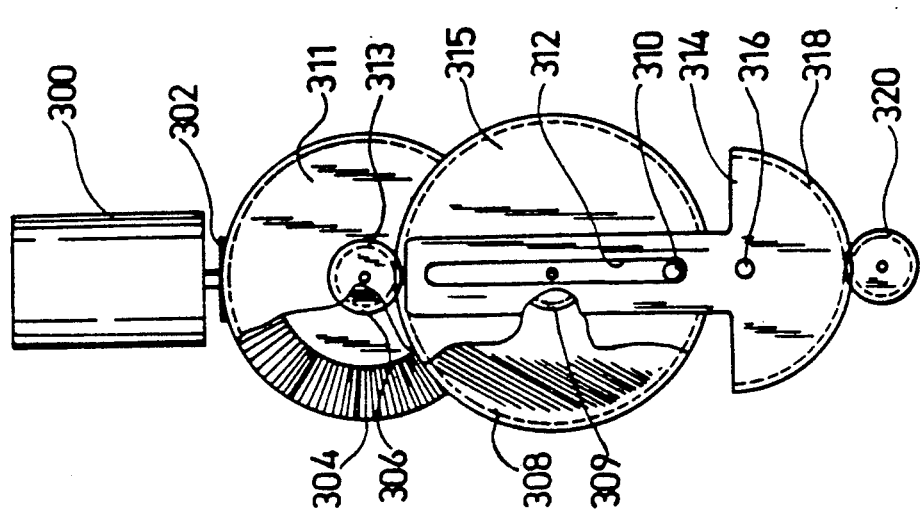
FIGS. 15A and 15B are respective side and sectional view illustrations of reciprocal drive apparatus useful in any of the embodiments of the invention in place of the apparatus of FIGS. 7 and 8.
Figure 15B:
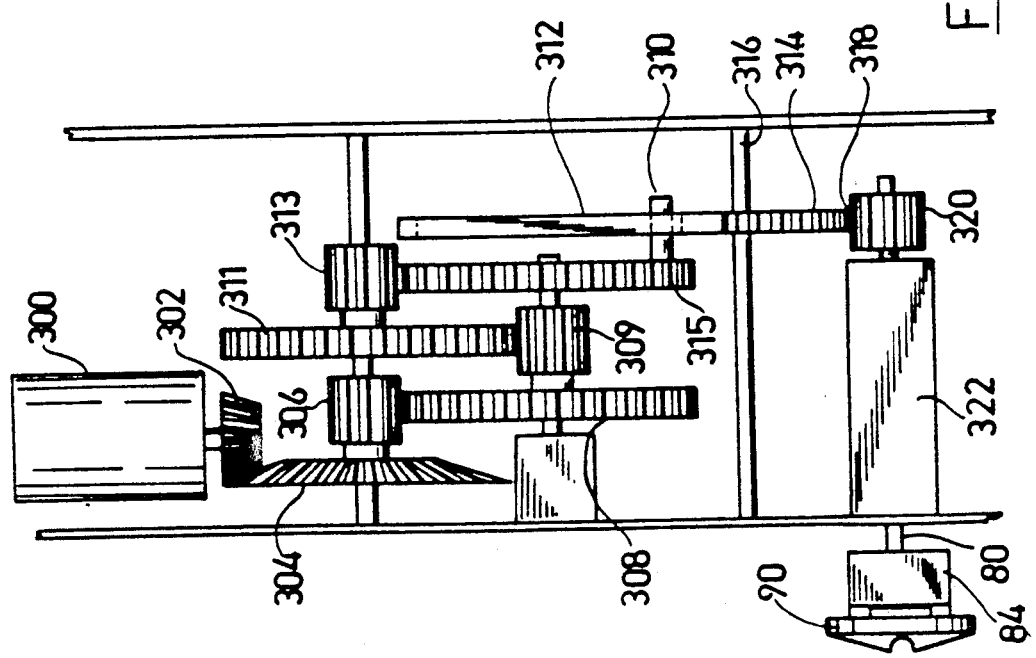

Reference is now made to FIGS. 15A and 15B which illustrate an alternative embodiment of reciprocal drive apparatus, which may be employed instead of the apparatus of FIGS. 7 and 8 in various embodiments of the present invention. The drive apparatus of FIGS. 15A and 15B comprises a motor 300 coupled to a conical gear 302, which drives a conical reducing gear 304 to which is fixed an intermediate gear 306, which drives a further reducing gear 308. Reducing gear 308 is fixed to an intermediate gear 309, which drives an additional reducing gear 311. Gear 311 is fixed to an intermediate gear 313 which drives a further reducing gear 315.

Formed on gear 315 is a pin 310 which engages a cam slot 312 in a cam 314 which is arranged to pivot about an axis 316 and is formed with a toothed gear surface 318. Surface 318, which is rotated about axis 316 in reciprocal motion by the engagement of pin 310 in slot 312, drives a gear 320 which drives stirrer engagement member 90 via a bearing assembly 322, drive shaft 80 and element 84.

Reference is now made to FIGS. 20A–20C which illustrate an alternative embodiment of stirrer 370, which comprises first and second side mounted plates 372 and 374 which are arranged for rotation about rods 42. The arrangement of the plates is that one plate, typically plate 372 is permitted to rotate up to a given amount in only a first direction away from cross bar 44, while the other plate 374 is permitted to rotate up to a given amount in only an opposite direction away from cross bar 44.

This arrangement is particularly useful for reciprocal stirring, inasmuch as motion of the stirrer 370 in a given direction in a fluid causes one of the plates to lie along cross bar 44 and the other of the plates to be disposed generally at an angle thereto, permitting fluid flow therepast. FIG. 20B illustrates the orientation of the stirrer for motion in a fluid in a first direction, while FIG. 20C illustrates the orientation of the stirrer for motion in a fluid in a second direction.

Reference is now made to FIGS. 17A, 17B and 17C which illustrate an alternative embodiment of stirrer which is useful in accordance with an embodiment of the invention. The stirrer may be identical to stirrer 34, as shown in FIG. 3, in comprising a main shaft 40 from which extend two rods 42, an extreme end 46, a near end 48 and a locating disk 50. In contrast to stirrer 34, there is provided a telescoping blade 330, typically having a curved bottom configuration 332, which is spring mounted at its two sides 334 and 336 onto rods 42, permitting blade 330 to be raised or lowered along rods 42 so as to follow the contour of an inner container surface.

Figure 18:
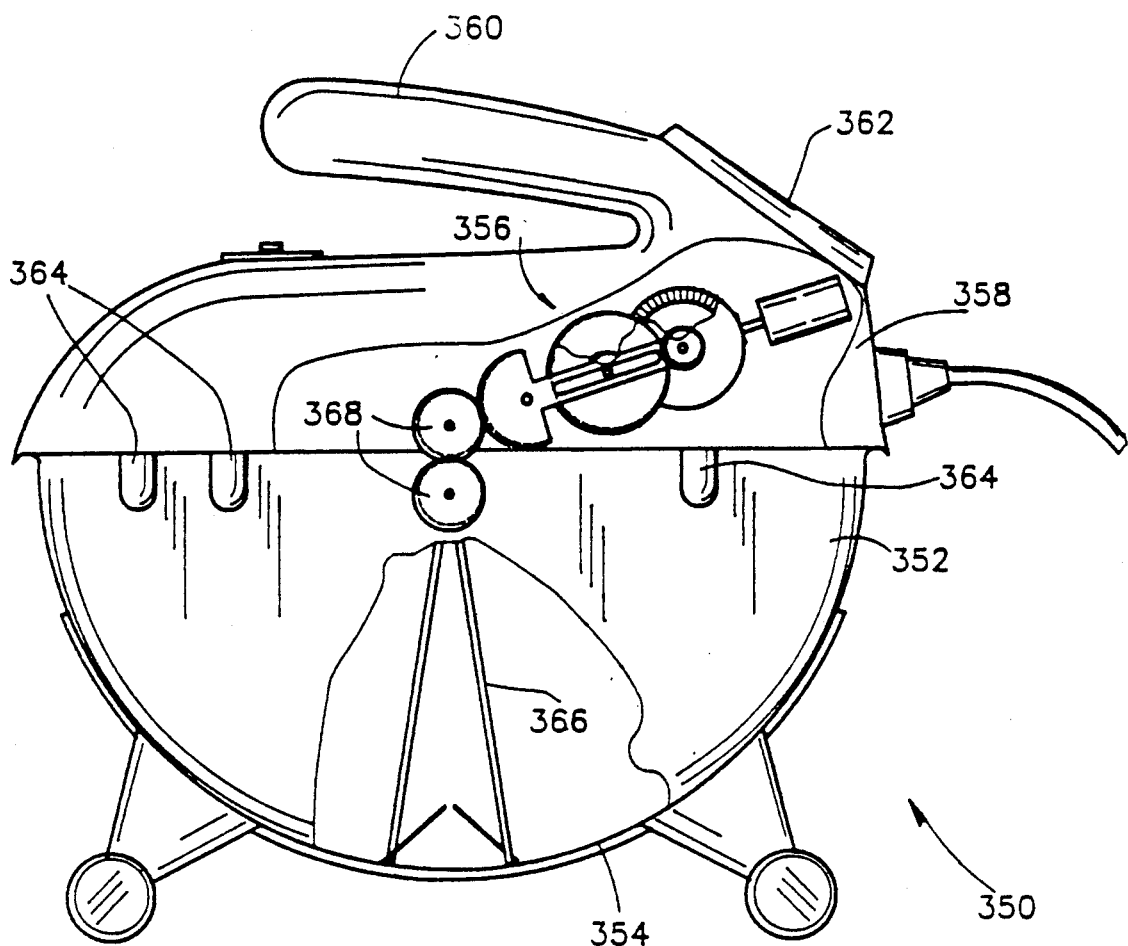
FIG. 18 is a partially cut away pictorial illustration of apparatus for domestic food cooking constructed and operative in accordance with an alternative preferred embodiment of the invention.

Referring now to FIG. 18, there is seen an alternative embodiment of domestic food cooking apparatus 350. The operation of the apparatus is essentially similar to that described hereinabove in connection with FIGS. 1 and 2, except that the apparatus here is somewhat more compact and comprises a self-supporting container 352 having integrally associated therewith a heating element assembly 354, such as that illustrated in FIGS. 5, 6A and 6B. A stirring driver 356 is mounted in a cover member 358 which also is formed to define a handle 360 for carrying the apparatus and to define an operator control panel 362. Electrical connections between the cover member 358 and the container may be provided by an internal electrical power interlock employing contact pins 364. The driver 356 drives a stirrer 366 via a gear or other drive 368 which may be either internal of or external to the container 352.

Figure 19:
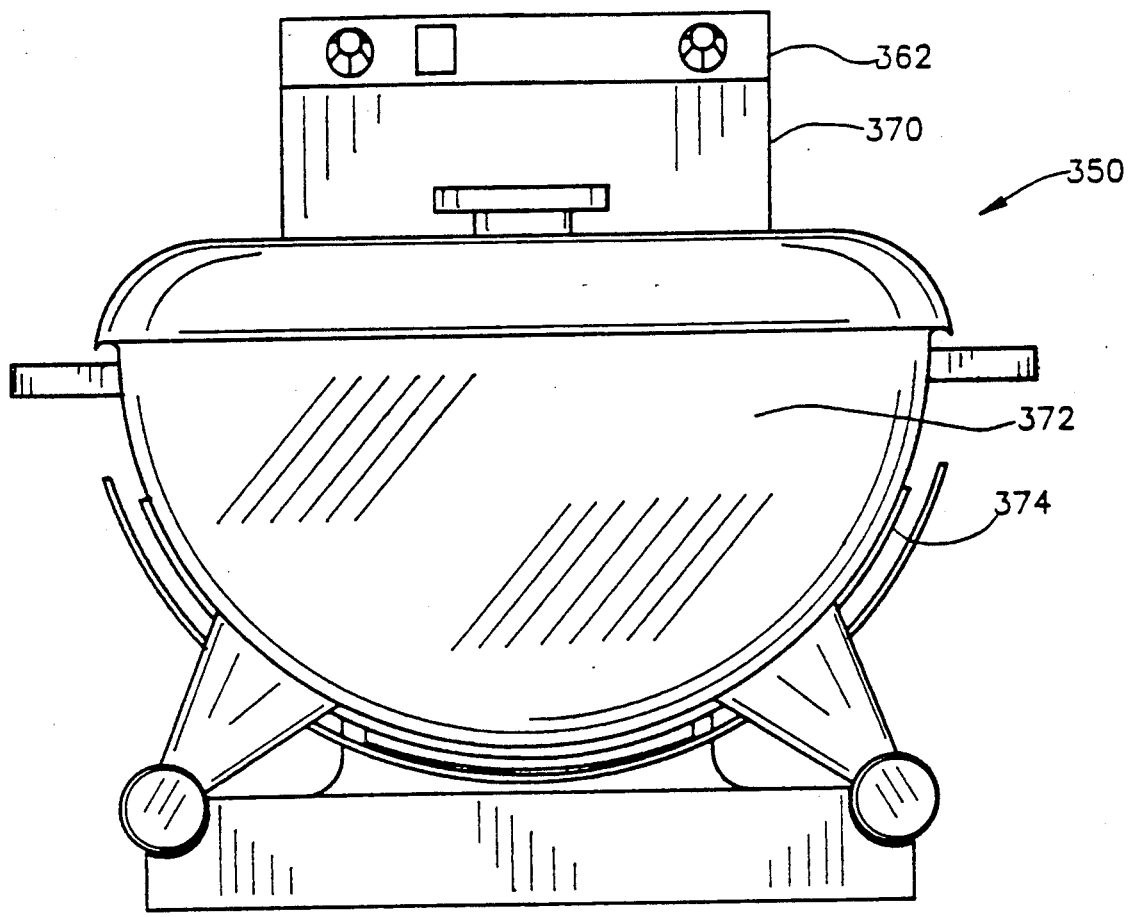
FIG. 19 is a pictorial illustration of apparatus for domestic food cooking constructed and operative in accordance with a further alternative preferred embodiment of the invention.

FIG. 19 illustrates yet another alternative embodiment of the invention incorporating a relatively narrow housing member 370 having a stirrer driver and quick coupler of the type illustrated in FIGS. 1 and 2. A self supporting container 372 having an integral heating element 374 is operatively engaged with base member 370 such that the stirrer in container 372 is driven by the driver in base 370.

Figure 25A:
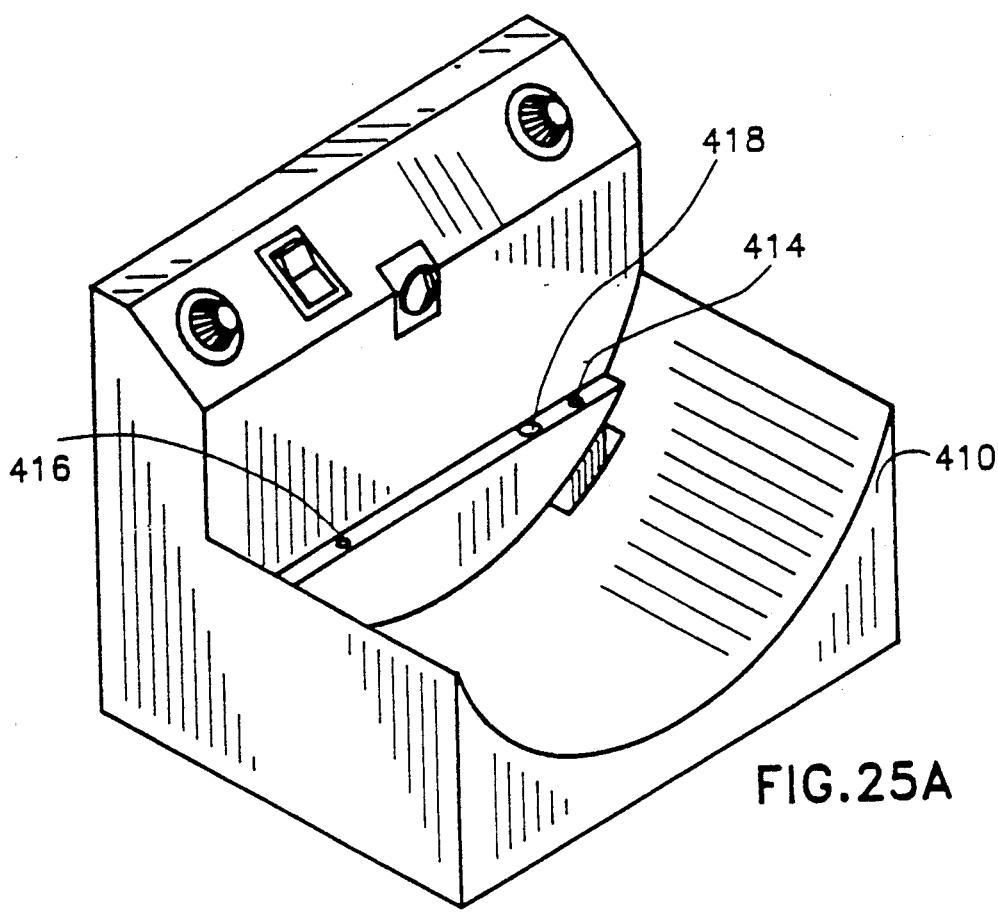
FIGS. 25A and 25B are respective pictorial illustrations of a base and a container constructed and operative in accordance with a preferred embodiment of the present invention.
Figure 25B:
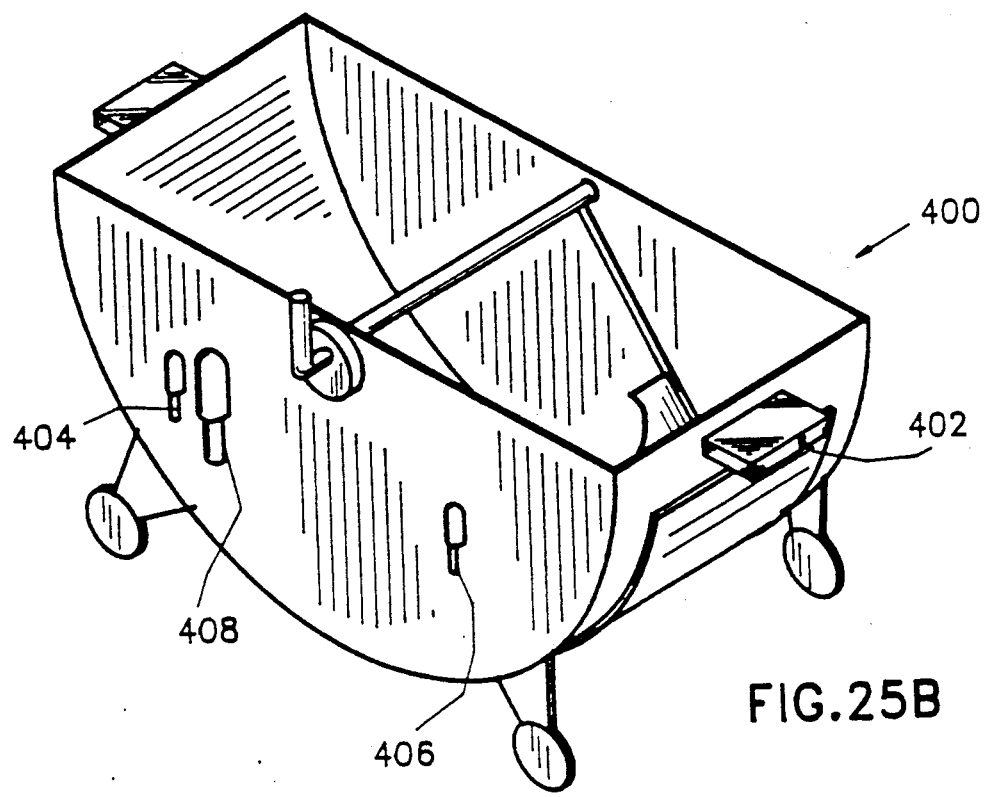
Figure 25C:
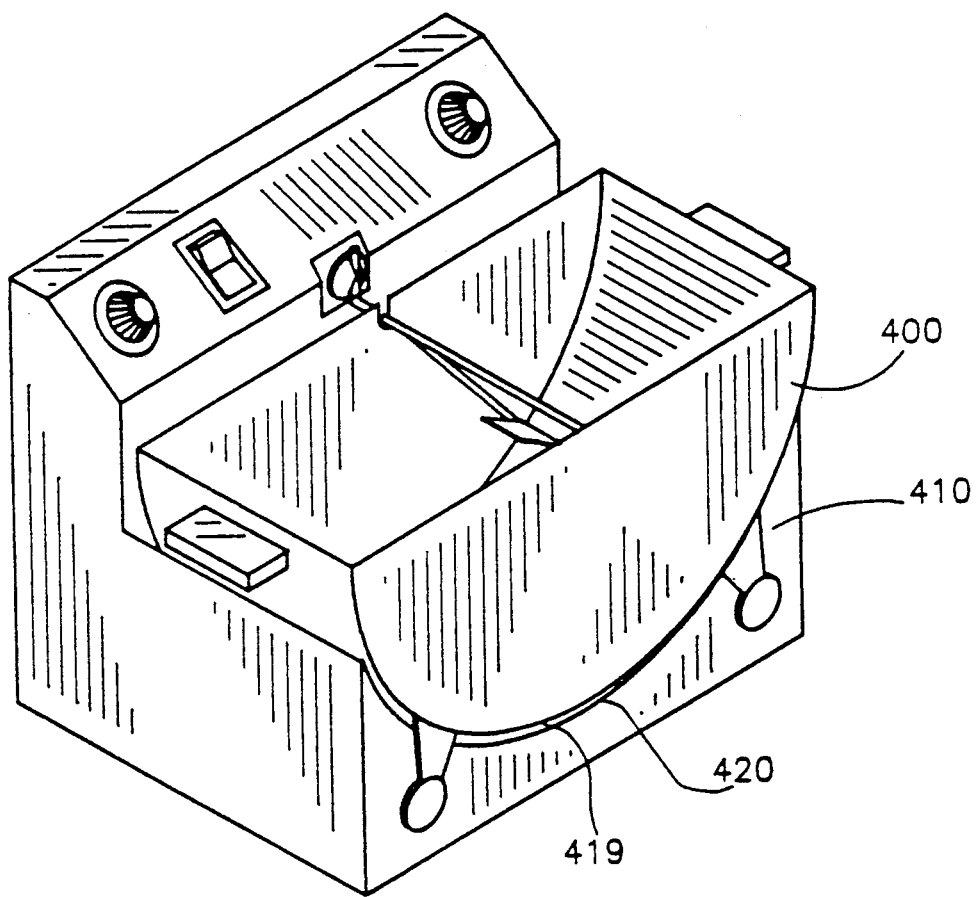
FIG. 25C is a pictorial illustration of the operative engagement of the base and container of FIGS. 25A and 25B.

Reference is now made to FIGS. 25A–25C which illustrate features of domestic food cooking apparatus which are not see in the embodiment of FIGS. 1 and 2. It is seen from a consideration of FIGS. 25A and 25B that a container 400 having a heating element 402 associated therewith in touching heat conductive and electrically insulative relationship is provided with male connectors 404 and 406, typically for electrical supply to the heating element 402 and another male connector 408 for electrical ground connection and for operating a safety switch (not shown) in the base 410 which permits electrical current to be supplied to the heating element 402.

Corresponding female sockets 414, 416 and 418 are provided in the base 410 for receiving respective connectors 404, 406 and 408.

Referring now particularly to FIG. 25C, it is seen that in the region of heating element 402 a space 419 is defined between the bottom of container 400 and the corresponding curved surface 420 of base 410. Preferably curved surface 420 is formed of a material which defines a heat reflector, such as an aluminium surface which is operative to reflect heat by radiation through the space 419, thus greatly increasing the efficiency of heating of the container and reducing the temperature of base 410.

Figure 26:
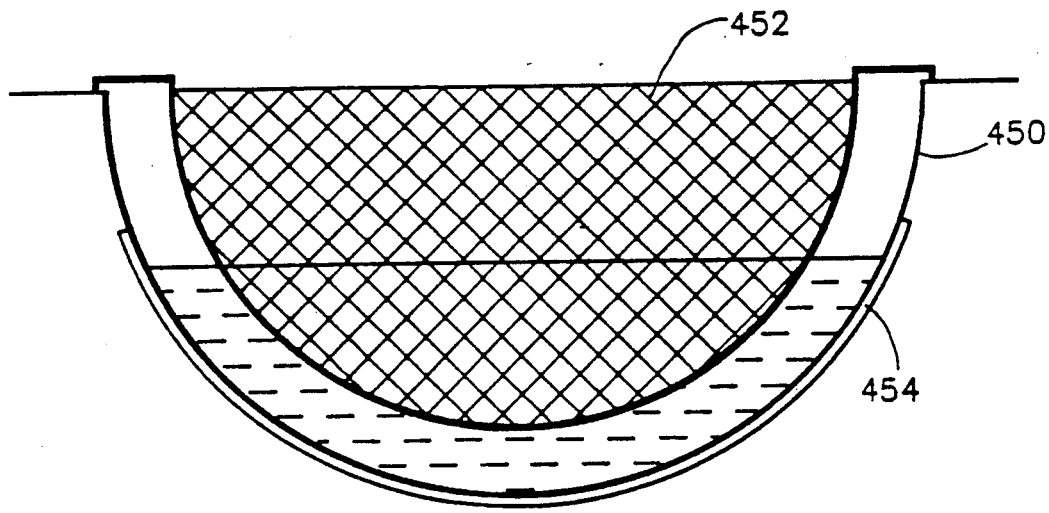
FIG. 26 is a side view sectional illustration of a container having an apertured inner member associated therewith, useful in accordance with an embodiment of the present invention.

Reference is now made to FIG. 26 which illustrates a container 450 having associated therewith an apertured inner member 452 adapted for holding food products during deep frying. Inner member 452 typically comprises a grid or screen of the type conventionally used in deep frying applications. Preferably a heating element 454 is fixedly associated with the container 450.

Figures 27A, 27B:
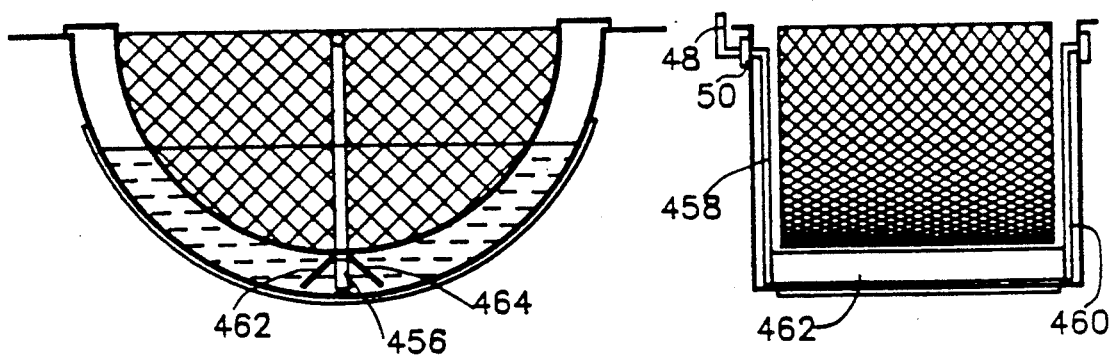
FIGS. 27A and 27B are respective side and end view sectional illustrations of a container having an apertured inner member and a stirrer associated therewith, useful in accordance with an embodiment of the present invention.

FIGS. 27A and 27B illustrate an arrangement of the type shown in FIG. 26 with the addition of a stirrer assembly 456. The stirrer assembly typically comprises a mounting and driving arrangement similar to that shown in FIGS. 10A-10C, wherein main shaft 40 in the embodiment of FIGS. 10A-10C is replaced by rods 458 and 460 which are joined by a pair of relatively angled elongate stirrer plates 462 and 464.

Figures 28A, 28B:
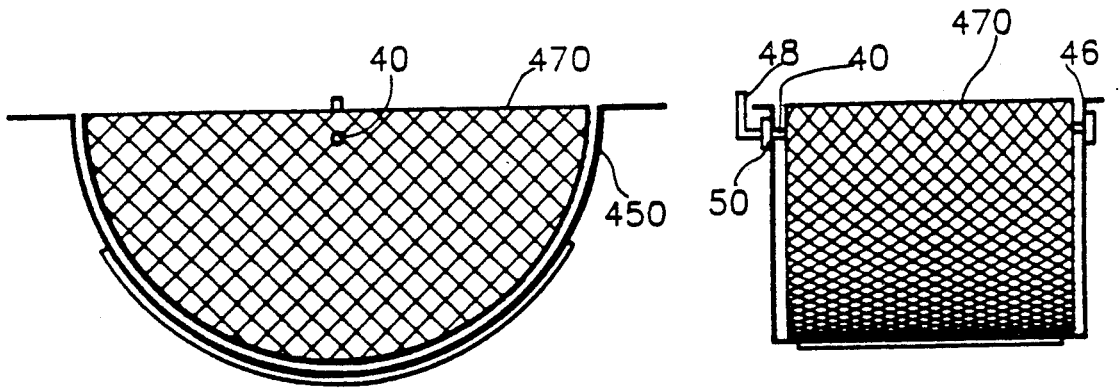
FIGS. 28A and 28B are respective side and end view sectional illustrations of a container having a rotatable apertured inner member associated therewith, in accordance with an embodiment of the present invention.
Figure 28C:
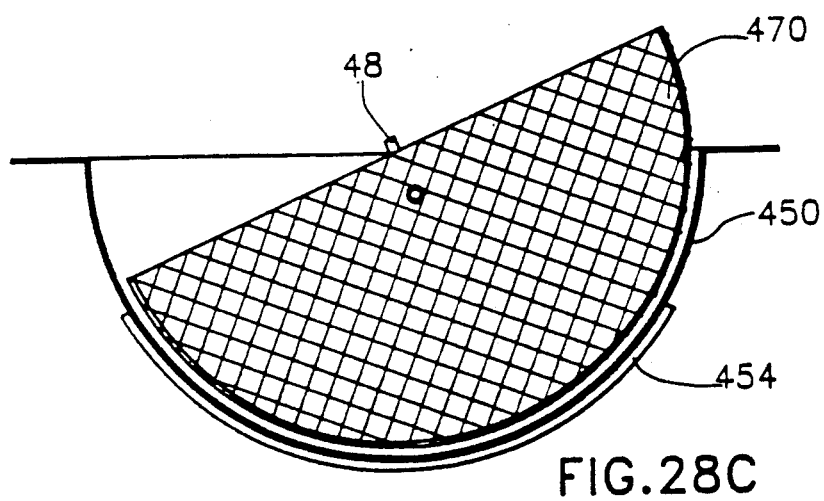
FIGS. 28C and 28D are side view sectional illustration of the container of FIGS. 28A and 28B in two opposite rotated orientations.
Figure 28D:
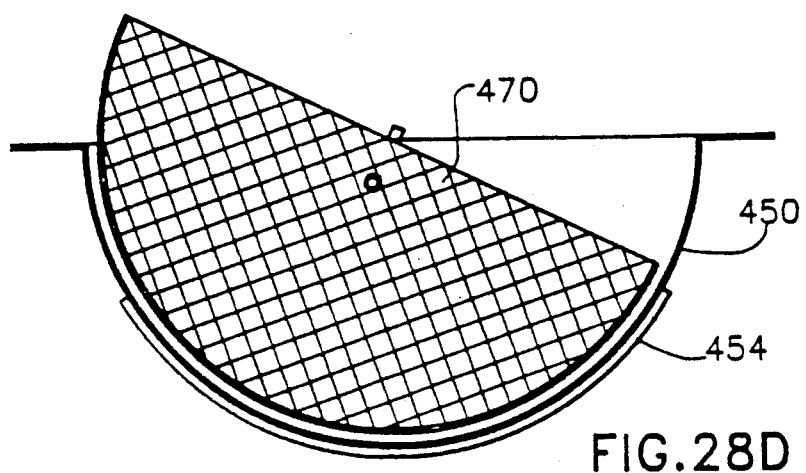

Reference is now made to FIGS. 28A-28D, which illustrate a synergistic integration of the embodiment of FIGS. 27A and 27B, wherein an apertured inner member 470 also itself defines a stirrer and is provided with a stirrer mounting and drive arrangement such as that shown in FIG. 10A, typically including elements 48, 50, 40 and 46. FIGS. 28C and 28D illustrate two typical extreme rotated orientations of the apertured inner member 470 with respect to container 450, which is fixedly associated with heating element 454.

Figure 29:
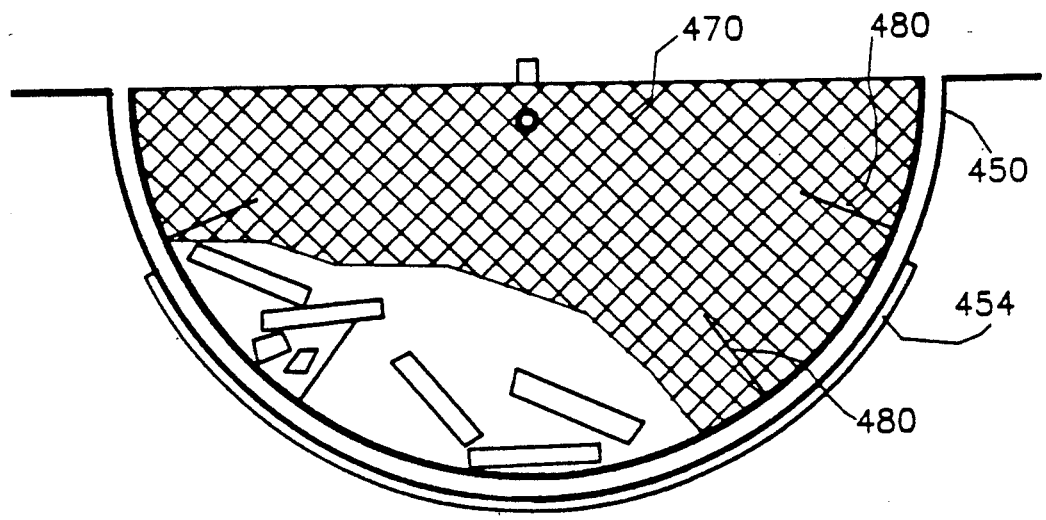
FIG. 29 is a partially cut away side view illustration of a container having a rotatable apertured inner member with upstanding bulkheads formed therein in accordance with an embodiment of the present invention.

FIG. 29 illustrates a variation of the embodiment of FIGS. 28A-28D in which upstanding bulkhead elements 480 are formed on the interior of inner member 470 to limit sliding of the food products relative thereto.

It will be appreciated that various features have been illustrated in the drawings and described above in various combinations and embodiments. It is to be understood that all of the features described hereinabove may be combined in any suitable combination in accordance with the present invention, notwithstanding that the specific combination has not been described or illustrated hereinabove.

It will be appreciated by persons skilled in the art that the present invention is not limited by what has been particularly shown and described hereinbelow. Rather the scope of the present invention is defined only by the claims which follow.

We claim:

1. Domestic food cooking apparatus comprising:
a container for holding a food product to be prepared and defining a heating surface;
electrical heating means associated with said heating surface; and
automatically operative stirring means operative associated with said container for providing stirring of the food product therein and including a motor, stirring drive means, gear means coupling the motor to said stirring drive means, and quick coupling means for automatically coupling the stirring drive means to a stirrer, and wherein
said container is configured to have a curved bottom surface of generally circular configuration and of generally uniform cross section.

2. Domestic food cooking apparatus according to claim 1 and wherein said heating means comprises a foil whose surface configuration generally conforms to the surface configuration of a surface of said container and through which an electrical current is passed for resistance heating thereof.

3. Domestic food cooking apparatus according to claim 2 and wherein said heating means also comprise web-type electrical insulation means surrounding said foil and electrically insulating said foil from said container.

4. Domestic food cooking apparatus according to claim 1 and wherein said stirring means comprises reciprocal stirring means.

5. Domestic food cooking apparatus according to claim 1 and wherein said container includes at least one double walled portion adjacent a heating surface and said heating means is located in said at least one double walled portion.

6. Apparatus according to claim 1 and also comprising heat control and timing control apparatus.

7. Domestic food cooking apparatus according to claim 1 and wherein said stirring means is arranged to undergo pivotal reciprocal motion about a pivot axis location generally at the center of a circle defined by the bottom heating surface for reciprocal motion along the bottom heating surface.

8. Domestic food cooking apparatus according to claim 1 wherein said stirring drive means is reciprocal.

9. Domestic food cooking apparatus according to claim 1 and wherein said heating means comprises a thin electrical conductor disposed between layers of electrically insulative material.

10. Domestic food cooking apparatus according to claim 1 and wherein said container includes at least an outer wall portion and an inner wall portion defining a heating surface; and said heating means comprises electrical resistance heating means located between said inner wall portion and said outer wall portion in intimate heat transfer engagement with, but electrically insulated from, said inner wall portion.

11. Domestic food cooking apparatus according to claim 2 and wherein the stirring means includes a stirring element having at least two spatially separated generally planar surfaces which lie in planes which are angled with respect to each other.

12. Domestic food cooking apparatus according to claim 1 and wherein said stirring means includes means for removable locking engagement of a stirrer with the container.

13. Domestic food cooking apparatus according to claim 1 and wherein said stirring drive means comprise an engagement portion which is arranged to permit engagement of the container and a stirrer with the housing irrespective of the relative orientations of the stirrer and the engagement portion.

14. Domestic food cooking apparatus according to claim 1 and wherein said stirring means includes two separate stirring elements each engaging a region of said container.

15. Domestic food cooking apparatus according to claim 1 and also comprising heat reflector means associated with said heating means for reflecting heat from said heating means towards said container.

16. Domestic food cooking apparatus according to claim 1 wherein said container has generally planar parallel side walls joined by the circularly curved bottom surface.

17. Domestic food cooking apparatus according to claim 1 and also including an inner food holding element associated with said container for supporting food therein.

18. Domestic food cooking apparatus according to claim 17 and wherein said inner food holding element comprises an apertured food holding element.

19. Domestic food cooking apparatus according to claim 1 and also including an inner food holding element associated with said container for supporting food therein and means for driving said inner food holding element in reciprocal rotation with respect to said container.

20. Domestic food cooking apparatus according to claim 1 and wherein said stirring means is arranged to undergo continuous rotational motion.

21. Domestic food cooking apparatus according to claim 1 and also comprising a layer of heat conductive material between said heating surface and a food product to be prepared.

* * * * *

UNITED STATES PATENT AND TRADEMARK OFFICE
CERTIFICATE OF CORRECTION

PATENT NO. : 5,050,490

DATED : September 24, 1991

INVENTOR(S) : Shimon Yahav et al.

It is certified that error appears in the above-identified patent and that said Letters Patent is hereby corrected as shown below:

Column 3, line 63, change "6A" to --6A and 6B--;

Column 3, line 66, change "6B" to --6C--;

Column 5, line 51, change "6A" to --6A and 6B--;

Column 5, line 58, change "6A and 6B" to --6A, 6B and 6C--;

Column 5, line 59, change "6A and 6B" to --6A, 6B and 6C--;

Column 6, line 9, change "6A" to --6A and 6B--;

Column 6, line 17, change "6B" to --6C--;

Column 8, line 7, change "6B" to --6C--;

Column 12, line 33, change "6A and 6B" to --6A, 6B and 6C--.

Signed and Sealed this

Twenty-third Day of March, 1993

Attest:

STEPHEN G. KUNIN

*Attesting Officer*  *Acting Commissioner of Patents and Trademarks*